(12) United States Patent
Hollosi et al.

(10) Patent No.: US 11,372,687 B1
(45) Date of Patent: Jun. 28, 2022

(54) GEO-SPATIAL WORKLOAD SCHEDULING IN DISTRIBUTED SYSTEMS

(71) Applicant: Blackshark.ai GmbH, Graz (AT)

(72) Inventors: Arno Hollosi, Graz (AT); Fabian Schlager, Graz (AT)

(73) Assignee: BLACKSHARK.AI GMBH, Graz (AT)

( * ) Notice: Subject to any disclaimer, the term of this patent is extended or adjusted under 35 U.S.C. 154(b) by 0 days.

(21) Appl. No.: 17/515,031

(22) Filed: Oct. 29, 2021

Related U.S. Application Data

(60) Provisional application No. 63/216,734, filed on Jun. 30, 2021.

(51) Int. Cl.
| | | |
|---|---|---|
| *G06F 9/50* | (2006.01) | |
| *G06N 7/00* | (2006.01) | |
| *G06F 9/54* | (2006.01) | |

(52) U.S. Cl.
CPC ............ *G06F 9/505* (2013.01); *G06F 9/5044* (2013.01); *G06F 9/544* (2013.01); *G06N 7/005* (2013.01)

(58) Field of Classification Search
CPC ..................................................... G06F 9/505
See application file for complete search history.

(56) References Cited

U.S. PATENT DOCUMENTS

| | | | |
|---|---|---|---|
| 2017/0185452 A1* | 6/2017 | Cao | ........................ G06F 9/5088 |
| 2019/0340010 A1* | 11/2019 | Lee | ........................ G06F 9/5016 |

* cited by examiner

*Primary Examiner* — Charlie Sun
(74) *Attorney, Agent, or Firm* — Beyer Law Group LLP

(57) ABSTRACT

Workload scheduling allows geospatial dependencies between workload items, which may vary in size, grouping or composition from workflow step to workflow step and can automatically adjoin existing data. By allowing dependencies between workload items in different steps, processing (and finish processing) of a dependent workload item begins in a subsequent step once its required workload items in a previous step have finished, thus enabling the processing of that dependent workload item before the previous step has completely processed all of its workload items. A dependency may be created because an item in a subsequent step intersects spatially with an item from a previous step, or because within a current step items have a buffer, necessitating that one item may depend upon spatially neighboring items. Workloads in two dimensions, three dimensions and higher may be used, and may be grid based, general polygons, or other in shape.

30 Claims, 18 Drawing Sheets

Grid-based Workload

Grid-based Workload

STEP A DIVISION OF WORKLOAD

STEP B DIVISION OF WORKLOAD

STEP A DIVISION
OF WORKLOAD

STEP B DIVISION
OF WORKLOAD

Geo-spatial Scheduling System

Directed Acyclic Graph

Example of Workload Definition

Example of Workload Definition

GEO-SPATIAL WORKLOAD SCHEDULING IN DISTRIBUTED SYSTEMS

This application claims priority of U.S. provisional patent application No. 63/216,734 filed Jun. 30, 2021, entitled "GEO-SPATIAL WORKLOAD SCHEDULING IN DISTRIBUTED SYSTEMS," which is hereby incorporated by reference.

This application is related to U.S. patent application Ser. No. 16/570,639 filed on Sep. 13, 2019, entitled "REALITY-BASED THREE-DIMENSIONAL INFRASTRUCTURE RECONSTRUCTION," and to U.S. patent application Ser. No. 17/127,821 filed on Dec. 18, 2020, entitled "VISUAL IMAGE ANNOTATION UTILIZING MACHINE LEARNING FOR IN-TIME FEEDBACK," both of which are hereby incorporated by reference.

FIELD OF THE INVENTION

The present invention relates generally to scheduling workloads in which the workflow is a directed acyclic graph (DAG). More specifically, the present invention relates to scheduling workloads in which a workload item of a particular workflow step may be dependent upon a workload item in a preceding step.

BACKGROUND OF THE INVENTION

Conventional job scheduling of a workload in a workflow is based upon the assumptions that a) dependencies between the steps of the workflow form a directed acyclic graph (DAG), that b) there are no dependencies between workload items, only between workflow steps, and that c) all steps work on the same size or amount of workload items. But, assumptions b) and c) are problematic in that requiring one step of a DAG to completely finish before the next step of the DAG begins means that overall processing is slower, compute nodes cannot be efficiently utilized, and that first results from an earlier step are not available until that entire step has finished processing. Requiring all steps to work on the same size or amount of workload items is not realistic in that sometimes processing of one work item requires a larger region because an area outside the work item is influencing that particular work item. In addition, different steps may be using different grids of different sizes for dividing up their work items, or may require work items of different sizes.

Unfortunately, no other known job scheduler is able to handle geospatial dependencies between work items nor different sizes of work items for steps. Among the various software and tools libraries available are popular projects such as: Apache Airflow (https://airflow.apache.org/); Flyte (https://github.com/flyteorg/flyte); Argo (https://github.com/argoproj/argo); Celery (https://docs.celeryproject.org/); ArcGIS (https://desktop.arcgis.com/en/arcmap/10.3/guidebooks/extensions/workflow-manager/); and DAGMan (part of HTCondor, https://htcondor.readthedocs.io/en/latest/users-manual/dagman-workflows.html). All of these tools are able to handle directed acyclic workflows, but are unable to express dependencies between workload items nor can handle different sizes for workload items.

Accordingly, techniques and systems are desired for workflows of a DAG that can handle these dependencies, and can also handle different workload item sizes in two dimensions, three dimensions and in higher dimensions.

SUMMARY OF THE INVENTION

To achieve the foregoing, and in accordance with the purpose of the present invention, a technique is disclosed that allows for dependencies between workload items in directed acyclic graphs, as well as for differently-sized work load items.

Our invention relaxes the requirements of (b) and (c) described above by allowing geospatial dependencies between workload items, which may vary in size, grouping or composition from workflow step to workflow step and can automatically adjoin existing data into workflow steps. By allowing dependencies between workload items in different steps, the invention is able to begin processing (and finish processing) a dependent workload item in a subsequent step once its required workload items in a previous step have finished, thus enabling the processing of that dependent workload item before the previous step has completely processed all of its workload items. A dependency may be created because an item in a subsequent step overlaps spatially with an item from a previous step, or because within a current step items have a buffer, necessitating that one item may depend upon spatially neighboring items. By contrast, prior art workflows must completely process all workload items in a prior step before beginning processing of workload items in a next dependent step because the workflow does not know from which items in the prior step a current item in the current step depends.

In addition, a job scheduler optimizes the mapping of work items to compute nodes (computers, virtual machines, containers, etc.) in order to reuse local caches that might exist on those computer nodes (from previous steps) and hence reduce network traffic and I/O in general.

The job scheduler is responsible for feeding input data to computation pipelines. As such, any efficiency gains therein mean a faster turnaround time, and potentially less cost, as any virtual machines need only to run for a shorter period of time. This is especially true for detecting errors, as the job scheduler is able to run the whole workflow item-by-item even in presence of geospatial dependencies, and thus producing early results long before the majority of the items have been processed. These early results give developers a chance to terminate computations early and fix their errors. In addition, incorporating existing data means that workflows can run incrementally and build upon the results of previous workflows. Having this logic being part of the job scheduler reduces the size of business logic in the workflow steps themselves: the steps can be reduced to just the algorithm at hand, without knowledge of the surrounding data management landscape. Thus, the invention allows for more efficient and more optimized job scheduling for large workloads which have geospatial dependencies; it significantly reduces the time before first results are accessible, allowing faster turn-around times, and has the ability to incorporate existing data into a workflow.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
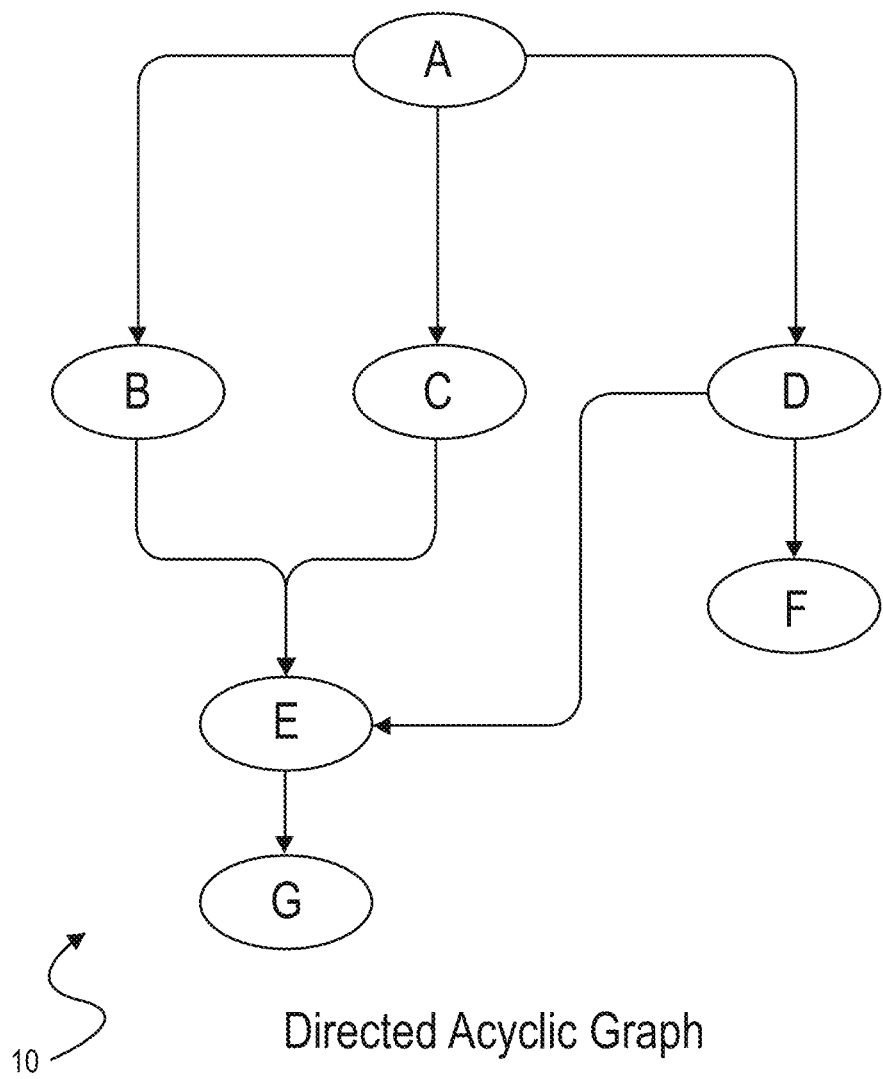
FIG. 1 shows a (prior art) directed acyclic graph (DAG).

FIG. 1 shows a (prior art) directed acyclic graph (DAG) 10. Like other workflow engines, the present invention enables the definition of workflow steps and their dependencies as a directed acyclic dependency graph. Steps can depend upon the results of previous steps: single dependency, e.g., G depends on E, or multiple dependencies, e.g., E depends on results of B, C, and D. In addition, steps can provide results for one or more following steps, e.g., B for E (single), and D for E and F (multiple).

Unlike the prior art, though, the present invention enables geospatial dependencies between workload items, and these workload items may vary in size, grouping or composition from step to step. Considering, for example, the processing of two-dimensional aerial images, a first step uses a computer model to detect buildings and a second step uses vectorization to detect building footprints in order to determine polygons. In the prior art, the first step must detect all buildings in major cities of the U.S. before moving on to the second step of using vectorization. Using the present invention, though, if the first step has detected all buildings in San Francisco, and those work items do not depend upon processing of other cities, then the second step of vectorization for San Francisco may begin before the first step has finished detecting buildings in all of the other major U.S. cities. Thus, results of the two steps are available for San Francisco before processing of the first step for the rest of the entire country is finished.

In a further example, if the processing of New York City in the second step requires a buffer outside the city limits (whereas the first step only required images within the city limits), then the second step requires a larger input area than in the first step. Moreover, images from within New York City may depend upon these images from outside the city limits. The present invention is able not only to process these dependencies between work items (i.e., images from within and without the city limits) but also to handle steps having different input sizes.

Overview

In general, the invention is applicable to workloads in Euclidean space and to grid-based workloads, i.e., workloads that can be organized in an n-dimensional grid, such as a three-dimensional (3-D) cube or in a two-dimensional (2-D) area or region, where there can exist a regular grid and where the extent of every workload item is a (natural numbered) multiple the smallest grid element. Workloads that are organized in four dimensions (and in higher dimensions) may also be used.

In general, a workflow refers to a set of steps that act as vertices in a directed acyclic graph (DAG) which encodes dependencies between the steps. The terms dependency or dependent are used in the following manner: if step B should be run after results from step A are available, because step B uses the results from step A as input, then step B is dependent upon step A, and step A's dependent is step B, or step B has step A as a dependency. A step is a node in the DAG and consists of a self-contained algorithm or processing method that takes input data, processes it, and produces output data. The input and output data might have different data types. A workload is a dataset which can be used as input to the given workflow, and a workload item is a division of the workload; if the workload is large enough so that it cannot be processed as a single whole, the workload is divided into smaller workload items. Context or buffer is used in the following manner: when a step reads data beyond its immediate defined workload item, i.e., if it accesses neighbouring data which itself is calculated from a previous step, then this neighbouring data is named context. Static data, i.e., data from a previous run or data which is not produced by a prior workflow step is not relevant for context. A grid is a rule used to divide the n-dimensional space into smaller units of same size, e.g., a network of uniformly-spaced lines along each dimension. For grid-based steps, the extent of every work item is a (natural numbered) multiple of the smallest grid unit. Each step might define its own grid.

The present invention allows us to define the following workload item-based dependencies and improved workflow:
  If a dependent step B has a different input size than the output size of a previous step A then wait only until those work items from the previous step A that intersect with the current step B's work item have finished before processing the step B work item; optionally include existing data to the input set of the dependent step B where necessary (i.e., where the step B work item overlaps that existing data). If step B has the same input size as step A, then only wait until the corresponding step A work item has finished.
  If the workload item of dependent step B needs neighboring data for processing (i.e., data which is not part of the work item itself because the step has a context or buffer), then: a) automatically depend that workload item on step A items processing neighbouring data as well, if that data is part of some scheduled workload item, or b) create new workload items in the dependent step that have the current workload item as its neighbor, and/or c) adjoin existing data to the input set of the dependent step.

Examples of Grid-Based Workloads

In an example of a 2-D area, a workload is a set of aerial images encompassing a 100 square-mile area and the smallest grid element may be a one square-mile area or an even smaller element such as an individual photograph. In another example, using Web-based maps, tiles are organized into a grid and the smallest tile is 256×256 pixels. And, a two-dimensional area need not necessarily be aerial images, it could be other two-dimensional data organized in space such as digital terrain/elevation/surface models (DTM, DEM, DSM), or a time series of defined metrics (time and one metric being the two dimensions, and other metrics being the values at the 2-D points), as long as we can define a metric, or distance function, which provides the notion of a distance between workload items thus allowing one to determine if items intersect, overlap, are adjacent or are within a buffer of another item.

Figure 2:
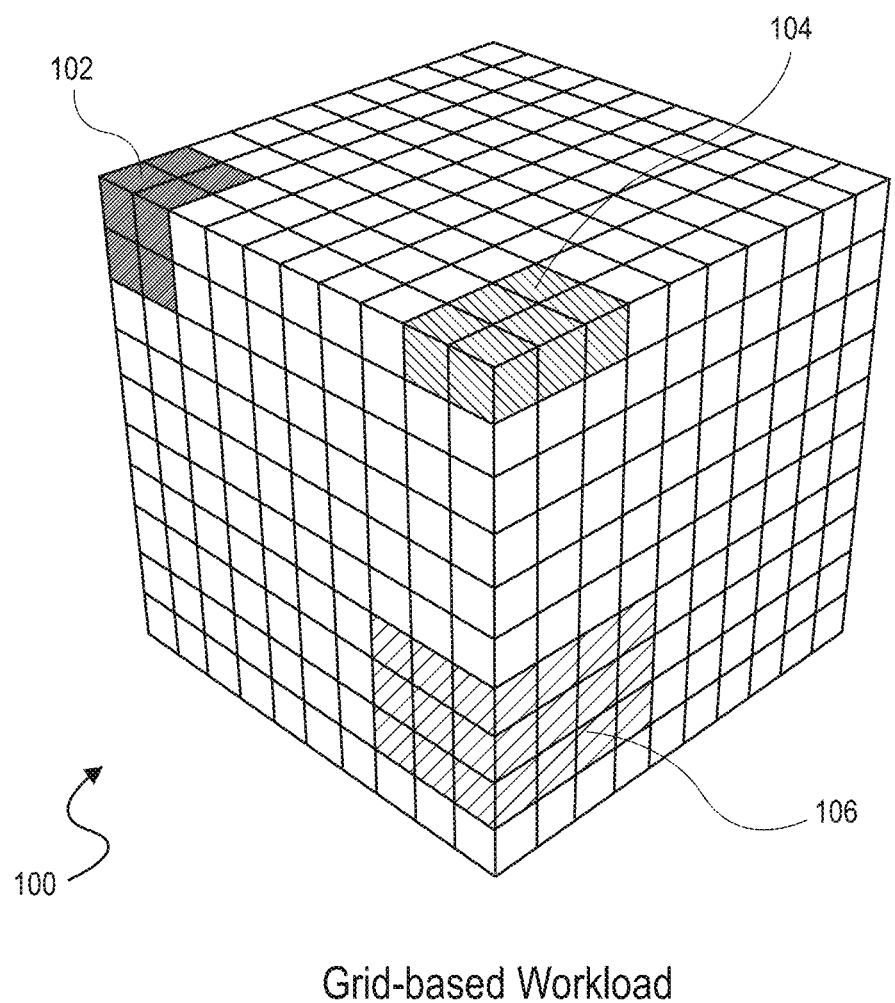
FIG. 2 illustrates an example of a three-dimensional grid-based workload.

FIG. 2 illustrates an example of a three-dimensional grid-based workload 100. In the example shown of the 3-D grid, each workload item (102, 104, 106) is a multiple of the smallest grid element (i.e., the smallest cube shown). Workload item 102 is a 2×2×2 sized workload, workload item 104 is a 1×2×3 sized workload, and workload item 106 is a 3×3×4 sized workload. In one example, workload cube 100 represents three-dimensional image data from various California cities such as San Francisco, Los Angeles and San Diego, represented as items 102, 104 and 106. Other examples of a three-dimensional grid-based workload are a time series of two-dimensional data (e.g., for change detection), or enriched two-dimensional data (e.g., a 2-D map with population density as the third dimension and pollution metrics as values at the 3-D points).

Figure 3A:
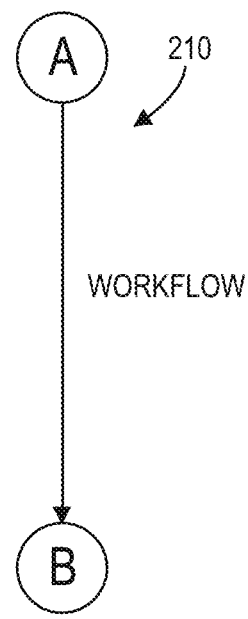
FIGS. 3A-3C illustrate an example in a two-dimensional grid where different steps of the workflow have workload items having different sizes.
Figure 3B:
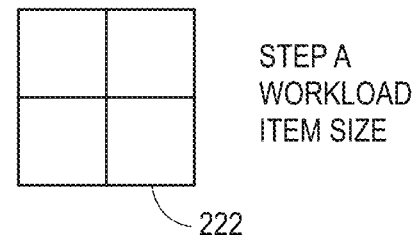
Figure 3B:
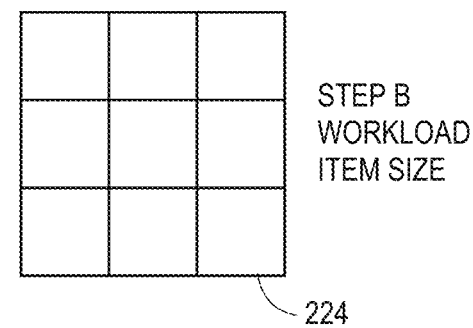
Figure 3C:
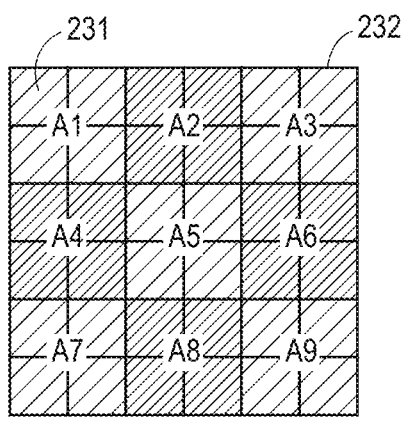
Figure 3C:
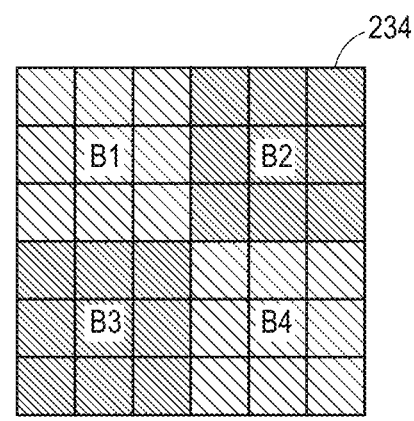

FIGS. 3A-3C illustrate an example in a two-dimensional grid where different steps of the workflow have workload items having different sizes. FIG. 3A shows a simple workflow 210 having two steps A and B, where step B depends upon the results from step A, i.e., workflow 210 may be represented as a DAG with two vertices A and B and where step B is dependent upon the results from step A. The size of the workload for this workflow 210 is 6×6 grid elements.

FIG. 3B illustrates the workload item size for each of the steps. Even though the workload to be scheduled for a particular project may be of any size with respect to the grid elements, each step may be only be able to handle or process a smaller-sized workload item at a time. By way of example, given a workload of aerial images having a size of one hundred square kilometers, a first step may only be able to process one square kilometer at a time, while a second, dependent step may be able to process five square kilometers at a time. As shown in FIG. 3B, step A's workload item size is 2×2 and step B's workload item size is 3×3, and as mentioned above, the size of the workload to be processed by this workflow is 6×6.

FIG. 3C illustrates how each step will divide up the overall workload into workload items that can be processed by that step. As shown at 232, step A divides up the 6×6 workload into nine different workload items, each workload item having a size of 2×2, which is the size of the workload item that step A can process at a time. Shown at 231 is one grid element of the workload such as a pixel, individual image, or region of the workload. And, as shown at 234, step B divides up the 6×6 workload into four different workload items, each workload item having a size of 3×3, which is the size of the workload item that step B can process at a time. In this example the grids of steps A and B are the same. Although the second step has a larger work item size than the first step, it is also possible that the second step has a smaller work item size than the first step.

Advantageously, the present invention can automatically derive and track the dependencies of workload items. A suitable metric or distance function is used to determine whether, for example, item B1 intersects with any items from the first step. For example, because workload item B1 includes item A1 and overlaps with items A2, A4 and A5, the invention automatically derives the dependency A1, A2, A4, A5→B1, indicating that workload item B1 depends upon workload items A1, A2, A4 and A5. Similarly, the following dependencies are also derived: A2, A3, A5, A6→B2; A4, A5, A7, A8→B3; and A5, A6, A8, A9→B4.

Figure 4A:
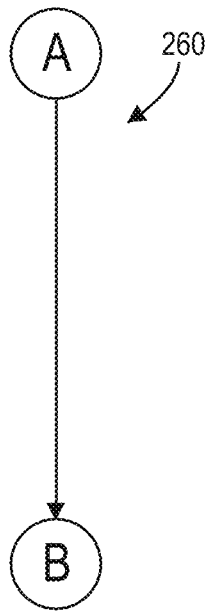
FIGS. 4A-C illustrate an example in a two-dimensional grid where a workload item in a given step reads and uses neighboring data calculated from a previous step.
Figure 4B:
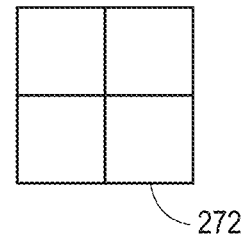
Figure 4B:
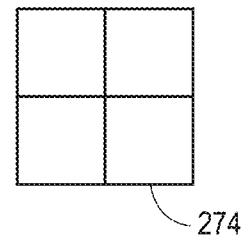
Figure 4C:
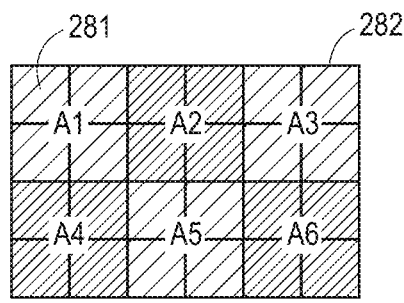
Figure 4C:
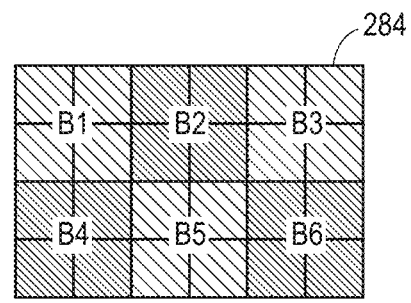

FIGS. 4A-4C illustrate an example in a two-dimensional grid where a workload item in a given step reads and uses neighboring data calculated from a previous step. FIG. 4A shows a simple workflow 260 having two steps A and B, where step B depends upon the results from step A, i.e., workflow 260 may be represented as a DAG with two vertices A and B and where step B is dependent upon the results from step A. The size of the workload for this workflow 210 is 6×4 grid elements. In this example the grids and work items for each step have the same size.

FIG. 4B illustrates the workload item size for each of the steps. Even though the workload to be scheduled for a particular project may be of any size with respect to the grid elements, each step may be only be able to handle or process a smaller-sized workload item at a time. By way of example, given a workload of aerial images having a size of one hundred square kilometers, a first step may only be able to process one square kilometer at a time, while a second, dependent step may be able to process five square kilometers at a time. As shown in FIG. 4B, step A's workload item size is 2×2 and step B's workload item size is also 2×2, and as mentioned above, the size of the workload to be processed by this workflow is 6×4.

FIG. 4C illustrates how each step will divide up the overall workload into workload items that can be processed by that step. As shown at 282, step A divides up the 6×4 workload into six different workload items, each workload item having a size of 2×2, which is the size of the workload item that step A can process at a time. Shown at 281 is one grid element of the workload such as a pixel, individual image, or region of the workload. And, as shown at 284, step B also divides up the 6×4 workload into six different workload items, each workload item having a size of 2×2, which is the size of the workload item that step B can process at a time.

In this example, each workload item of step B will need to read and use the immediate neighboring data from the previous step, i.e., each workload item of step B will also have a context (or buffer) of one grid element or one tile. Again, a suitable metric or distance function is used to determine if a particular item is within the buffer of another item. By way of example, workload item B1 not only requires workload item A1, but also workload items A2, A4 and A5, expressed as: A1, A2, A4, A5→B1. Similarly, each of B2, B3, B4, B5 and B6 will also depend upon multiple work items from step A that are within one grid element of the step B workload item. Advantageously, the present invention can automatically derive and track these dependencies of workload items. Thus, the invention automatically derives and tracks these other dependencies: A1, A2, A3, A4, A5, A6→B2; A2, A3, A5, A6→B3; A1, A2, A4, A5→B4; A1, A2, A3, A4, A5, A6→B5; A2, A3, A5, A6→B6.

Even if only workload item A1 is scheduled as input, then the present invention can still derive, schedule and track the processing not only of B1, but also of B2, B4, and B5; and, can adjoin existing data from previous runs of A2-A6 for the workload items B2, B4, and B5.

Consider this example. Assume we execute the workflow on imagery of New York state from 2019 (i.e., represented by work items 1-6). A year later we receive new imagery not for the whole state but only for New York City from 2020 (i.e., represented by work item 1). Step A is, e.g., building footprint detection, which we only execute on the new imagery from 2020, i.e., work item A1.

But if the follow-up processing step B needs buffer/context, then two things follow: (a) B1 (from 2020) reads data from A1 (from 2020), but also from A2, A4, A5 (from 2019); (b) B2, B4, B5 need to be run again, because their context has changed. That is, B4 (from 2020) reads data from A4 (from 2019) and also from A2, A5 (from 2019), but crucially it also reads data from A1 (from 2020). As the context might influence the output B4 (from 2020) might be different from B4 (from 2019) although A4 did not change between 2019 and 2020. Thus, the above assumes pre-existing data sets (from 2019) in order to perform this new scheduling (in 2020). The below paragraphs also flesh out these implications in detail.

Further, note that a buffer can not only be expressed in terms of grid elements (e.g., one grid element surrounding a work item, the closest two grid elements, etc.), but also can be given by a function that describes any shape or form around a work item, e.g., it is possible to specify a function that results in circle-like shapes that surround a given workload item, or even shapes with holes in them, or a distance from a work item.

Figure 5:
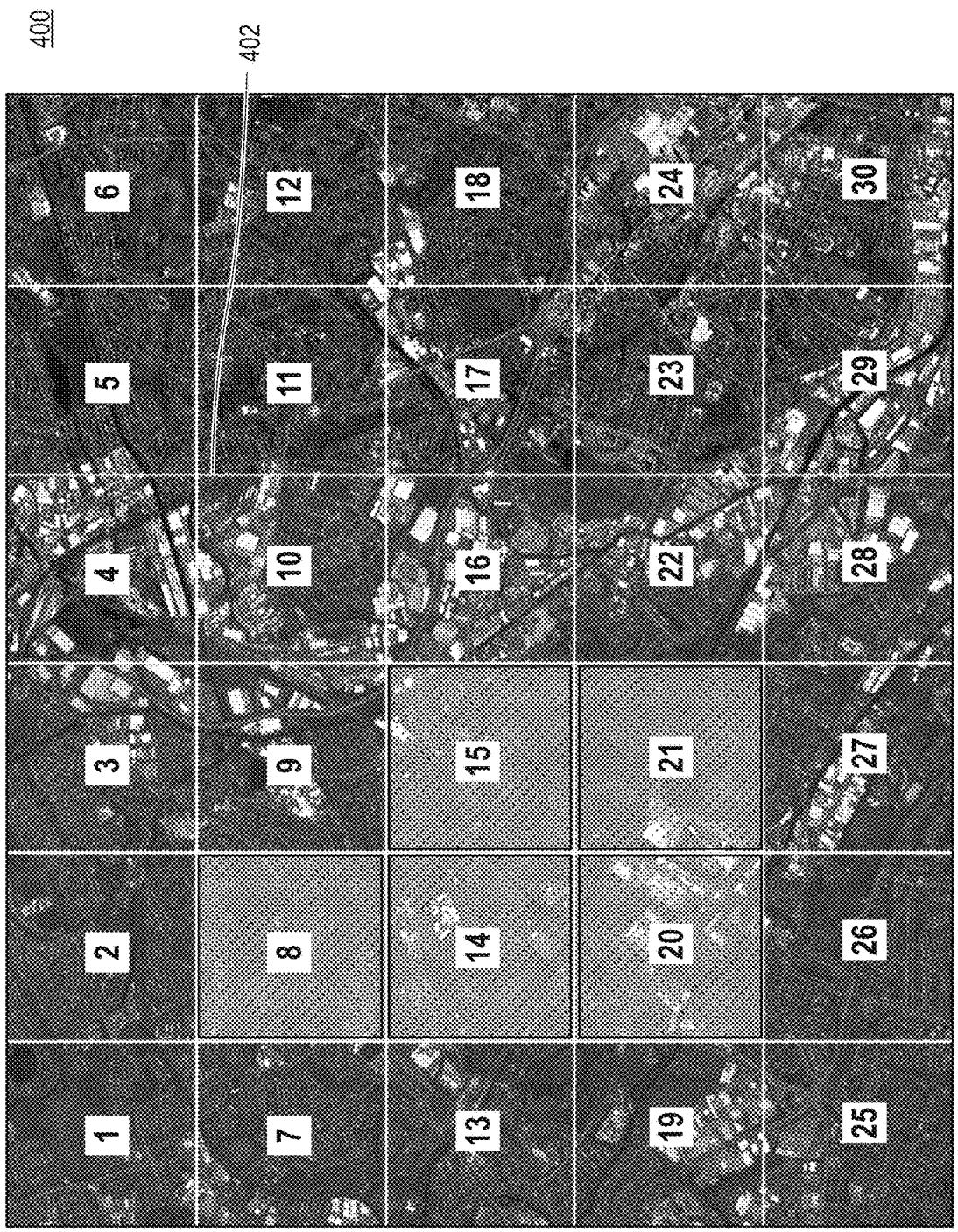
FIG. 5 illustrates an example in a two-dimensional grid where a workload item in a given step may or may not use neighboring data calculated from a previous step.

FIG. 5 illustrates an example in a two-dimensional grid where a workload item in a given step may or may not use neighboring data calculated from a previous step. Shown is a two-dimensional aerial image 400 of a metropolitan area in which a grid 402 divides up the image into tiles having sizes of, for example, 256×256 pixels, 512×512 pixels, 1024×1024 pixels, etc. Of course, other sizes of tiles are possible and even though image 400 appears as a single image, it may be composed of multiple images, such as an image per tile.

Assume a simple workflow having two steps A and B, where step B depends upon the results from step A, i.e., the workflow may be represented as a DAG with two vertices A and B and where step B is dependent upon the results from step A. Also assume that only grid tiles 8, 14, 15, 20 and 21 are the workload and are input into step A and are processed, that steps A and B use the same grid, and that step B has no context, i.e., does not require a buffer around tiles. Therefore, B8 depends only upon A8, B14 only upon A14, etc.

In a variation, assume a one-tile context for step B, meaning that each tile will have a one-tile buffer or area of influence around it. Thus, tile 14, for example, will have a buffer that includes tiles 7-9, 13-15 and 19-21, and these buffer tiles (if being processed in step B) will likewise be dependent upon the results from tile 14. Typically, as grids are defined in terms of the smallest unit such as the tiles shown, accordingly, a buffer is then expressed in terms of whole tiles. In other non-grid based workloads the buffer may be expressed in terms of an absolute distance (e.g., meters) from the boundary of a region, from a center of a region, etc.

Therefore, assuming a one-tile buffer for step B,
B8 depends upon the results from A8, A14, A15 (because only these three tiles are processed in step A)
B14 and B15 both depend upon A8, A14. A15, A20, A21
B20 and B21 both depend upon A14. A15, A20, A21

Because of the buffer, tile B8 would use data from tiles A1, A2, A3, A7. A9 and A13 if that data is pre-existing from an earlier run, but, even though B8 uses this adjoining pre-existing data it does not depend upon it. In other words, B8 already has data from tile A1 available (for example), but needs to wait for the data from A8, A14 and A15 from the processing in step A.

In addition, assuming that tiles 8, 14, 15, 20 and 21 are being updated and that corresponding data from step A already exists for the below tiles (e.g., from a previous run) the following workload items are scheduled for processing in step B with these dependencies:
B1 depends on A8
B2 depends on A8
B3 depends on A8
B7 depends on A8, A14
B9 depends on A8, A14, A15
Items B10, B13, B16, B19, B22, B25, B26, B27 and B28 also depend upon those A8, A14, A15, A20 and A21 tiles that are within one tile Note that these B tiles listed immediately above (the left two-thirds of image 400 except for tile 4) are being processed because of the one-tile buffer around tiles 8, 14, 15, 20 and 21, whose update and processing in step A will influence these B tiles. Note also that although tile B1 is dependent upon A8, it may also read in data from tiles A2 and A7 that is pre-existing, even though tile B1 does not depend upon tiles A2 and A7.

Figure 6A:
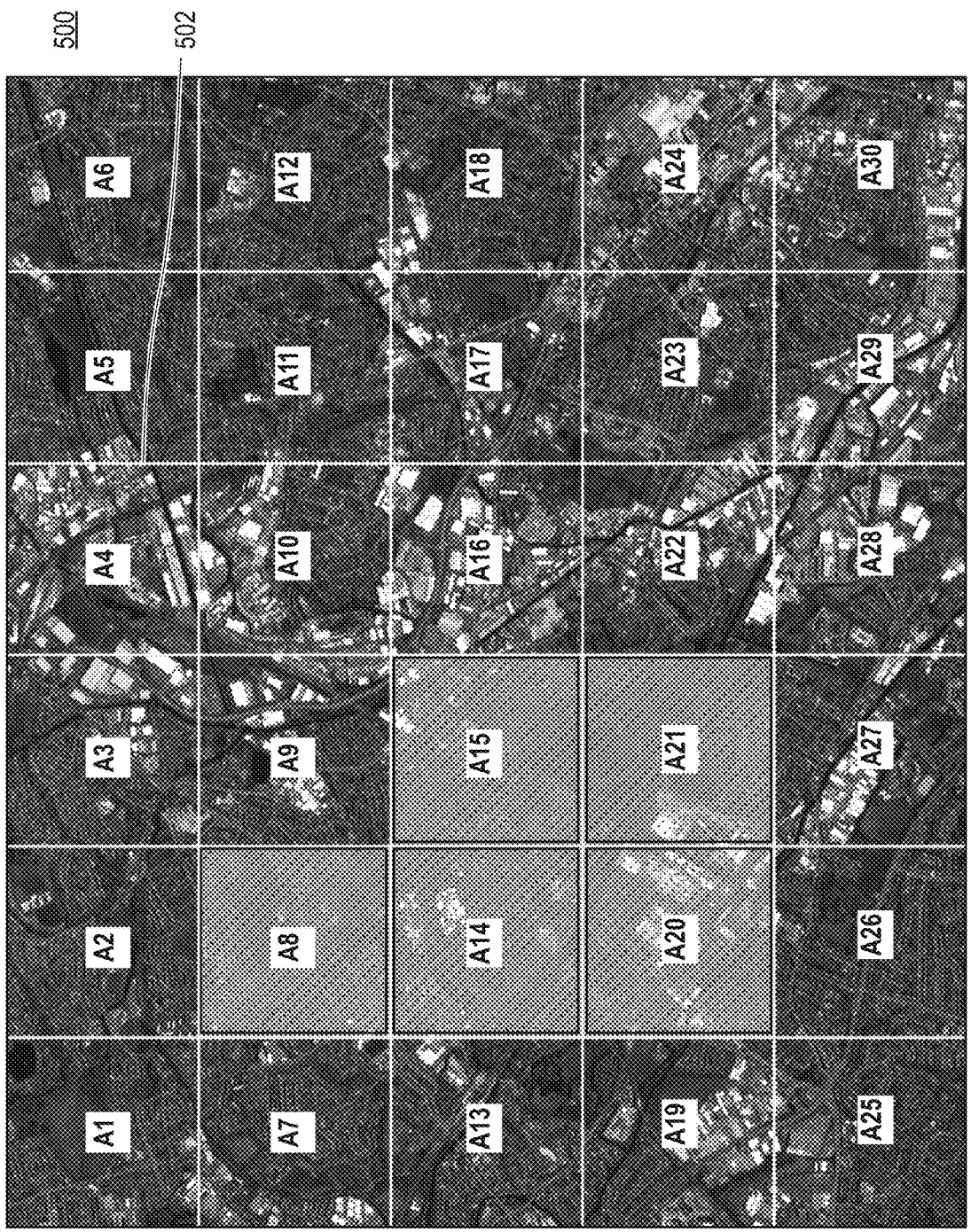
FIGS. 6A-6C illustrates an example in a two-dimensional grid in which workload steps use different grid sizes and differently-sized work items.
Figure 6B:
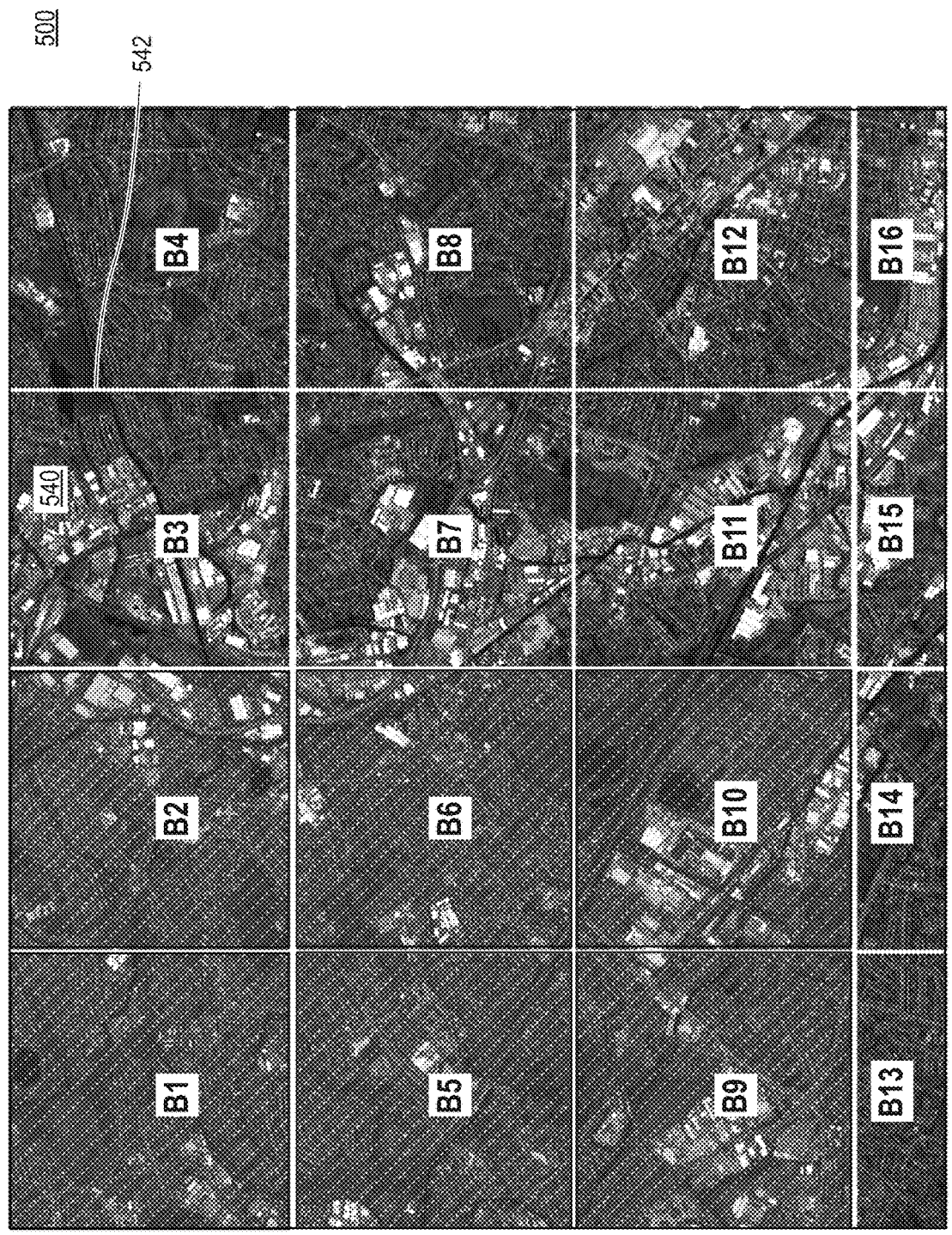
Figure 6C:
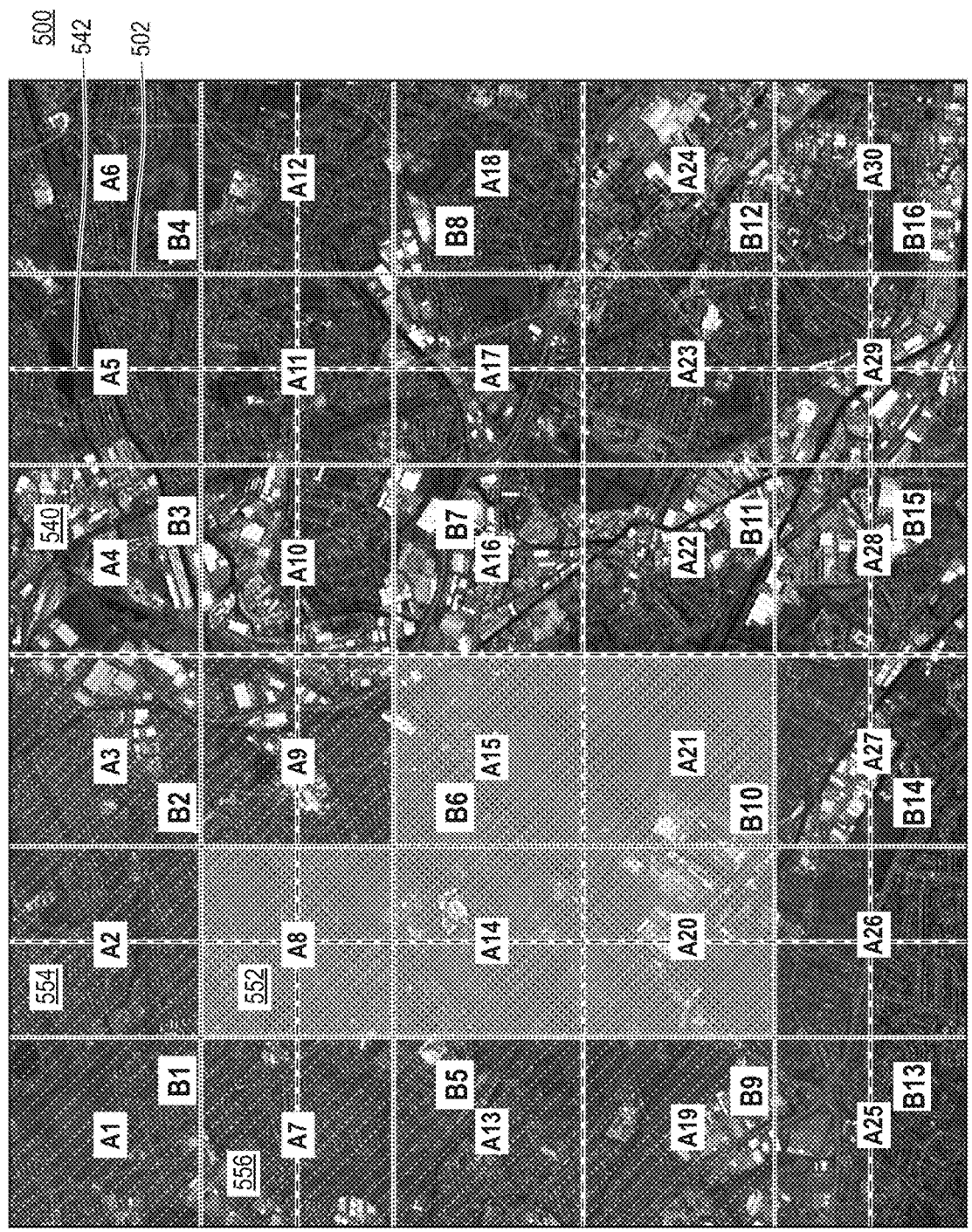

FIGS. 6A-6C illustrate an example in a two-dimensional grid in which workload steps use different grid sizes and differently-sized work items. Assume a simple workflow having two steps A and B, where step B depends upon the results from step A, i.e., the workflow may be represented as a DAG with two vertices A and B and where step B is dependent upon the results from step A.

FIG. 6A shows a two-dimensional aerial image 500 of a metropolitan area in which a grid 502 divides up the image into thirty different tiles or sub-images. Although image 500 looks to be single image, it may also be a collection of thirty different images, or tiles, each having a dimension of, for example, 256×256, 512×512, or 1024×1024, etc. pixels. Alternatively, image 500 may have been originally a single image, but preprocessing has divided it up into thirty different images. Assume that the input grid for step A is 200×200 pixels and assume that tiles A8, A14, A15, A20 and A21 are input into step A, i.e., Step A includes workload items A8, A14, A15, A20 and A21.

FIG. 6B shows the same two-dimensional aerial image 500 of a metropolitan area in which a grid 542 divides up the image into at least sixteen different tiles or sub images. Assume that the input grid for step B is 300×300 pixels; shown are potential workload items B1-B16.

FIG. 6C shows the same two-dimensional aerial image 500 of a metropolitan area in which both grids 502 and 542 are shown. Assuming that tiles A8, A14, A15, A20 and A21 are input into step A and that step B has no buffer requirement, then tiles B1, B2, B5, B6, B9 and B10 will be processed in step B (because these are the tiles that overlap with tiles A8, A14, A15, A20 and A21 that have been processed in step A and allow that region to be processed). These then are the dependencies in step B:
B1 depends on A8 (because the region of A8 overlaps with that of B1),
B2 depends on A8 as well,
B5 depends on A8, A14 (because it overlaps with A8 and A14),
B6 depends on A8, A14, A15
B9 depends on A20
B10 depends on A20, A21

Note that every step B workload item contains some area where the current A step delivers some results, but also an area where there is no data from the current A step. For instance, area 552 (top-left quadrant of A8) is an area of step A that delivers results to item B1 of step B, and the remainder area of B1 (item A1 and portions of items A2 and A7) does not depend on any results from step A. The basic idea is wherever a B tile intersects with an A tile a dependency is created. For example, B10 depends on A20 and A21, because their areas intersect. Although B10 also intersects with A26, A27 this does not create a dependency, because A26 and A27 are not an input into step A (in this example), hence there are no work items for A26 and A27, and dependencies are only concerned with work items that are processed, not with pre-existing data. Nonetheless, the input area for B10 is the B10 tile and it may read pre-existing data (e.g. from a previous run) from A26 and A27. Thus, if data from previous runs for these areas exists, it is used as input to B, otherwise only the data from the current step is used. For instance, if data from item A1 and from those portions of items A2 and A7, 554 and 556, does exist from a previous run (i.e., a previous processing of step A), it can be used as input to item B1 of step B.

In another example, using FIGS. 6A-6C, assume that step B requires a one-tile context (or buffer) for all tiles or work items. As the context or buffer is defined for step B, it is B's tile size we are referring to. Context manifests itself in two ways: additional dependencies are added to the input work items; and new areas are scheduled as work items in step B.

Considering tile B1, without context. B1 depends only upon A8, because their areas intersect. Given a one-tile context for step B, we enlarge the input size of B1 to B1+B2+B5+B6 (the "ring" around B1; because these tiles will influence B1 because of the one-tile buffer). Now this enlarged input area intersects with A8, A14, and A15. Hence, given the one-tile context for B, B1 will now depend upon A8, A14, and A15 (instead of just upon A8 as in the previous example). Note that again we are only concerned about work items that are part of the current instance of the workflow, therefore neither A2, A3, A7, A9, or A13 create dependencies for B1. They may be part of B1's input though, if such data exists.

Considering tile B3 as an example, without context, B3 is not scheduled as a work item: it has no dependency on any A input—its area does not intersect with any tile area that is input in step A. But, with a one-tile buffer, other tiles input into step A will now influence tile B3 and the scheduler extends B3's input size by one tile, including B2, B4, B6, B7, and B8. This new input area intersects with A8, A14, and A15 and hence B3 needs to be processed, i.e., a work item needs to be scheduled. The reason being that changes in the one-tile buffer around tile B3 might affect the result within B3. The scheduler may not know for sure, but according to the step B specification, if a one-tile context is given, it schedules B3 for processing too. B3's dependencies are thus A8, A14, and A15, and it may read in pre-existing data for areas it overlaps.

Thus, when step B is specified as having one-tile context, in addition to the above dependencies and processing of items B1, B2, B5, B6, B9 and B10, workload items B3, B7, B11, B13, B14 and B15 will also be scheduled as workload items for step B because each of their one-tile buffer zones extends over at least one of tiles B1, B2, B5, B6, B9 and B10, which overlap with one of A8, A14, A15. A24 or A21.

Examples of Euclidean Space-Based Workloads

As mentioned above, the invention is applicable to grid-based workloads; it is also applicable to workloads present in any Euclidean space, i.e., a workload in which the extent and shape of each workload item or element (and its dependency) is not necessarily defined by a grid or cube. Basically, the scheduling of Euclidean space-based workloads will have the same properties as grid-based workload scheduling, but here the extent and shape of each workload item is specified by a bounding box, a bounding polygon, a bounding volume of any shape, a centroid plus a distance, or similar means to encompass the workload item. In these cases the scheduler may use spatial operators such as intersect, overlaps, buffer, dilation, etc., in order to calculate dependencies along the DAG and to calculate how the workload items of one step might influence or create dependencies at later steps. In general, two-dimensional workloads include any random polygons and three-dimensional workloads include any shape or volume.

Figure 7:
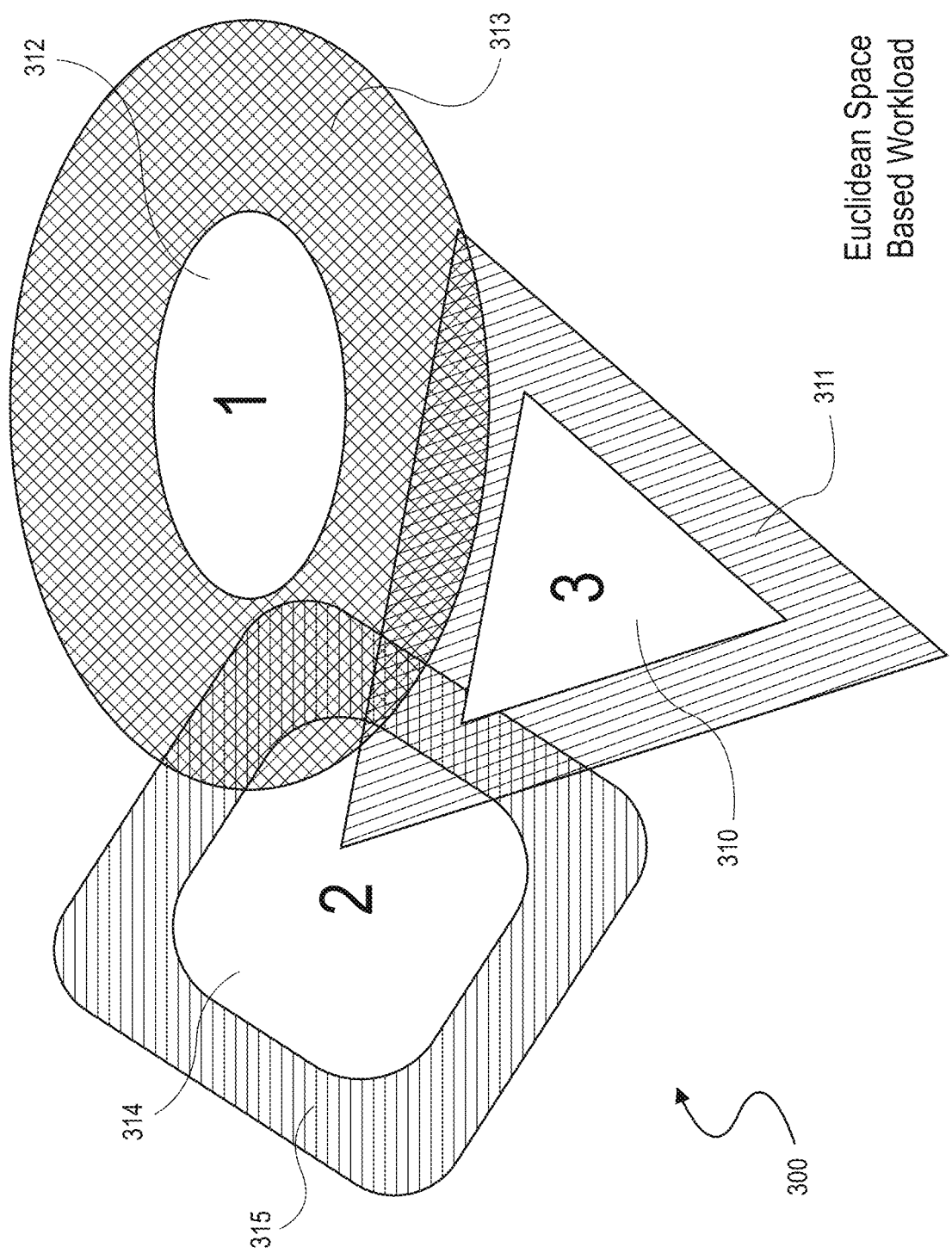
FIG. 7 illustrates a two-dimensional Euclidean space-based workload.

For grids, typically the images will be adjacent to each other. But, this is not a hard requirement. The scheduler is only concerned whether images (or images plus a buffer) intersect one another. In FIG. 7 the shapes are not perfectly adjacent to each other (there is a small gap), but they still influence each other because their buffers intersects the other shapes.

FIG. 7 illustrates a two-dimensional Euclidean space-based workload 300 in which there are three workload items, triangle area 310, oval area 312 and square area 314. Three-dimensional Euclidean space-based workloads are also possible as are those of higher dimensions. For example, a four-dimensional space may be time-series of three-dimensional data, such as building shapes at different points in time. A one-dimensional workload is possible and an example is a distance-based metric, such as nearby population density along a road. As shown, triangle 310 has an outer influence area (or "buffer") 311 that intersects with square 314 but not with oval 312. Oval 312 has an outer buffer area 313 that intersects with square 314 but not with triangle 310. And, square 314 has an outer buffer area 315 that intersects with triangle 310 but not with oval 312.

In order to illustrate the dependency of one workload item upon another, consider the example of a given DAG of A-B (step B is dependent upon step A), and the three workload items (oval 1, square 2, and triangle 3) that are each input to step A and processed. Further, consider that step B requires a context (or "buffer" or "influence area") around each workload item, shown as shaded areas 311, 313 and 315, indicating how each workload item may influence the processing of other workload items. In other words, step B requires that, e.g., for workload item triangle 3, its processing must include not only its own data from area 310, but also any data from other areas that intersect with triangle 3's buffer 311, meaning the processing must include (or is dependent upon) the data of square 2 as well, because the buffer area 311 of triangle 310 overlaps square 314. In this fashion, a given workload item via its area of influence can cause another workload item to be dependent upon the given workload item.

Thus, the processing of oval B1 depends on oval A1, and square A2 (as the buffer area 313 overlaps with square 314); the processing of square B2 depends upon square A2, and triangle A3 (as buffer area 315 intersects triangle 310); and the processing of triangle B3 depends upon triangle A3 and square A2 (as buffer area 311 intersects with square 2).

Figure 8:
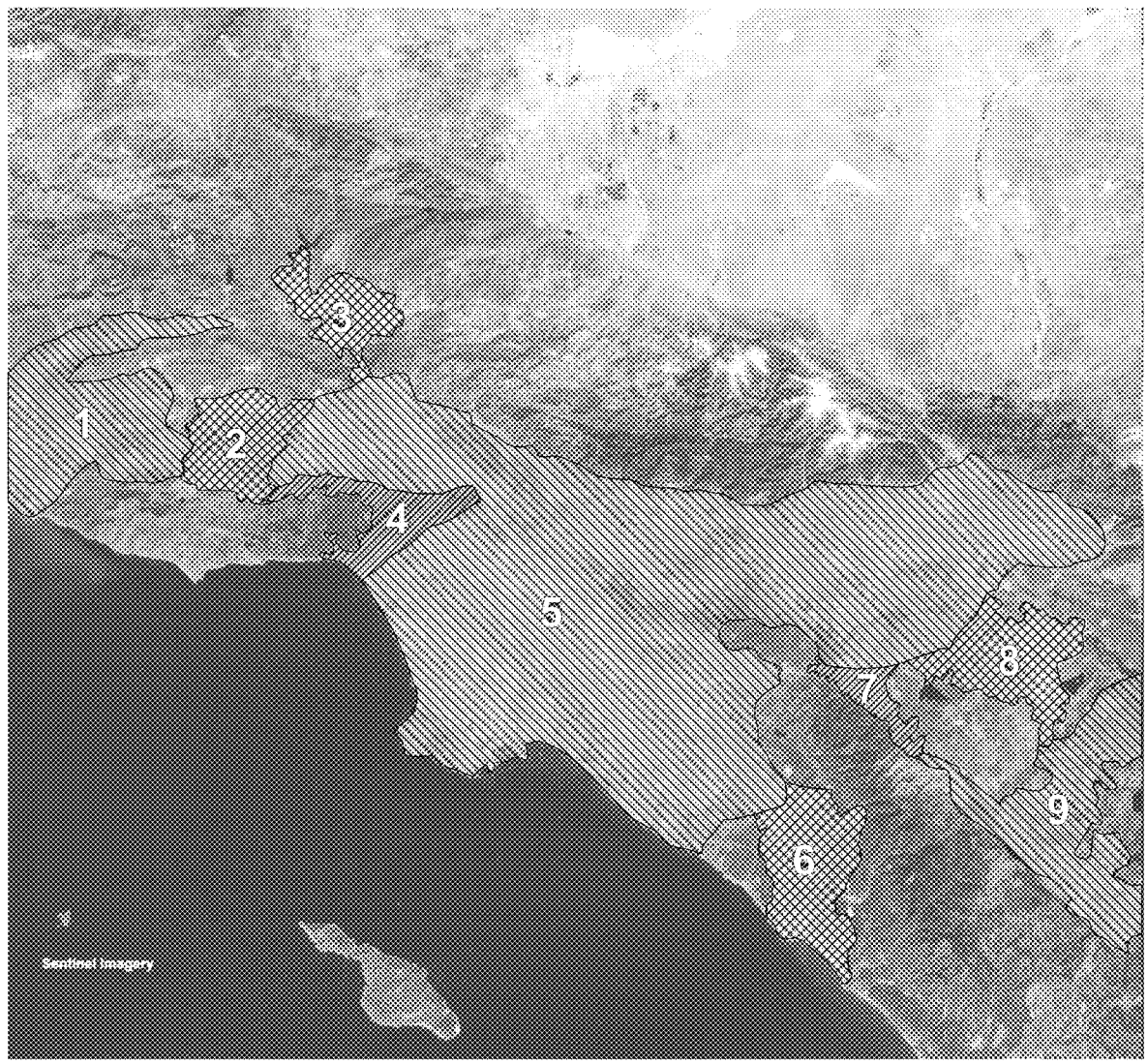
FIG. 8 illustrates another two-dimensional Euclidean space-based workload.

FIG. 8 illustrates another two-dimensional Euclidean space-based workload 330 in which a workload item in a given step reads and uses neighboring data calculated from a previous step. Workload 330 shows the Los Angeles metropolitan area and may be divided into nine workload items, 1-9, as shown. Assume a simple workflow having two steps A and B, where step B depends upon the results from step A, i.e., the workflow may be represented as a DAG with two vertices A and B and where step B is dependent upon the results from step A. Also assume that all areas 1-9 are input into step A (either as set of nine distinct areas or as a single workload that is split into nine work items during scheduling) and that step B requires a 100-meter buffer around each area. In other words, in order to process a given area or work item, the computation of step B requires that any neighboring data within 100 meters of the boundary of a given area must be processed as well, and hence additional dependencies occur. Thus, for example, the computation of area 3 in step B will also require data from area 5 from step A (because areas 3 and 5 adjoin, the buffer of area 3 will overlap with area 5), but the computation of area 7 in step B will not require data from area 8 from step A (because areas 7 and 8 do not adjoin and are greater than 100 meters apart, the buffer of area 7 will not intersect with area 8).

Note that B3 will depend upon data from A3 and A5, i.e., it reads all data from area 3 and either reads all data of area 5 as well or—in a possible optimization—only reads a small part of area 5 (that is at most 100 m away from area 3). In both cases, computation of B3 can only start when both computation of A3 and A5 have finished. Hence, we say "B3 depends upon A3 and A5."

Regarding the meaning of being dependent upon a previous work item, generally speaking, the later work item uses the output data from the previous work item as input. There may be cases when the algorithm of step B—upon processing data—realizes that data from neighboring areas is not needed, and hence waiting for the previous step's computation of neighboring areas was not needed. But this is only known once processing of that item in step B starts, and thus cannot be known by the scheduler in advance. Thus, generally a step waits for computation of a previous step if there is a dependency.

Accordingly, workload items 1 to 9 can be computed in parallel in step A (i.e., A1 to A9), but, the workload items B1-B9 will have the following dependencies and cannot be processed until the work items upon which they are dependent have finished processing:

B1 depends on A1, A2
B2 depends on A1, A2, A4, A5
B3 depends on A3, A5
B4 depends on A2, A4, A5
B5 depends on A2, A3, A4, A5, A6, A7, A8
B6 depends on A5, A6
B7 depends on A5, A7, A9
B8 depends on A5, A8, A9
B9 depends on A7, A8, A9

Figure 9:
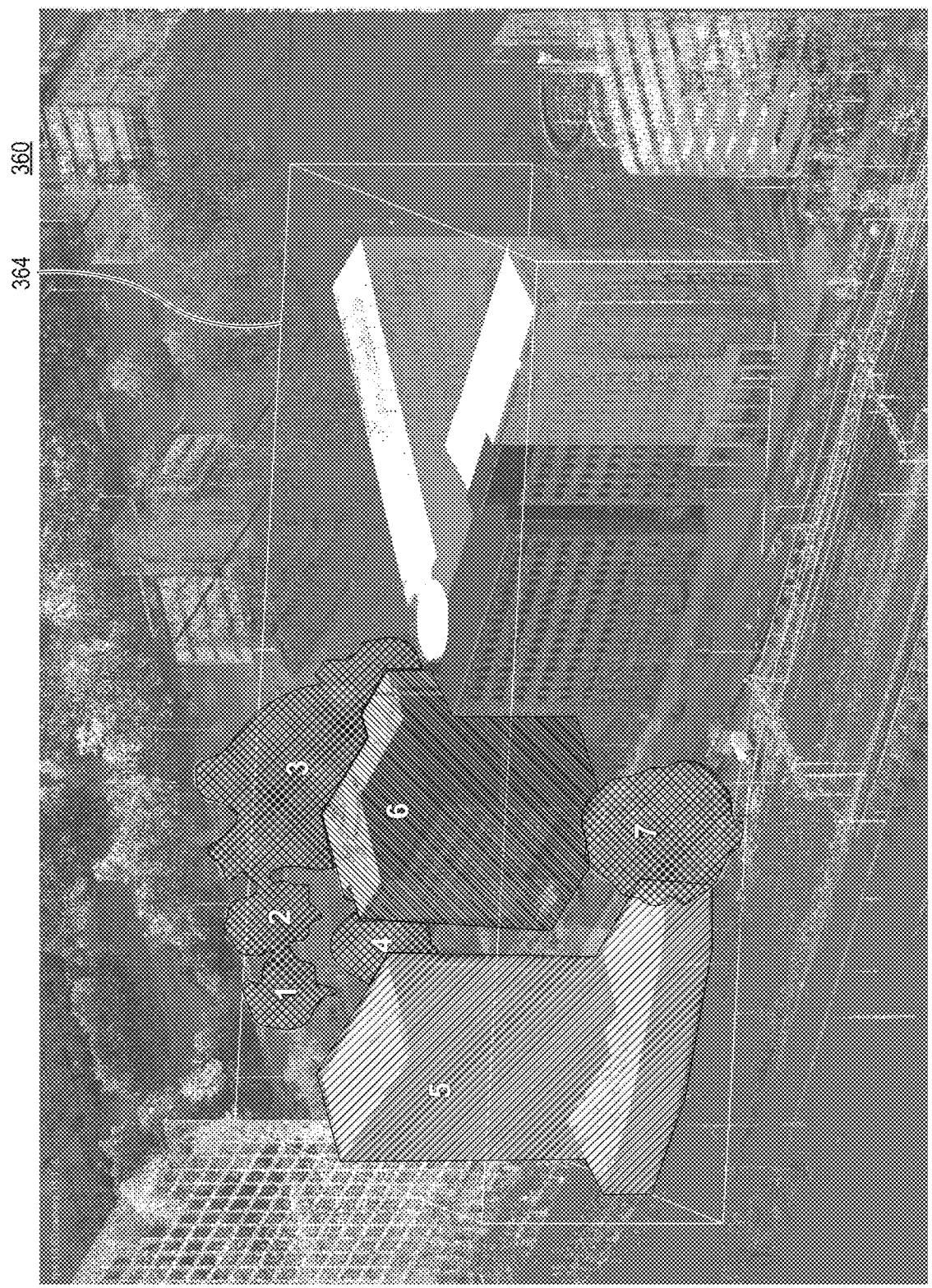
FIG. 9 illustrates a three-dimensional Euclidean space-based workload.

FIG. 9 illustrates a three-dimensional Euclidean space-based workload 360 in which a workload item in a given step reads and uses neighboring data calculated from a previous step. In general, examples of three-dimensional Euclidean space-based workloads include point cloud representing three-dimensional objects (such as automobiles, obstacles, pedestrians, etc. detected using LIDAR) used in the development of autonomous vehicles, each point having a defined location in three-dimensional space. Or, each point cloud represents the buildings, vegetation, etc., of a city detected using an airplane flyover. Again, it is possible to define a metric or distance function which can be used to determine whether two point clouds intersect, or are within a buffer region of another.

Workload 360 shows a 3-D point cloud of a business district and may be divided into seven workload items, 1-7, as shown. Items 1-4 and 7 represent trees and items 5 and 6 are buildings. Bounding box 364 represents a region in which a point cloud is formed and items 1-7 are items in that cloud to be processed. Typically, the neighboring data from the output of step A will be used in the input to step B, as explained below in the context of the 5-meter buffer.

Assume a simple workflow having two steps A and B, where step B depends upon the results from step A, i.e., the workflow may be represented as a DAG with two vertices A and B and where step B is dependent upon the results from step A. Also assume that all volumes 1-7 are input into step A (either as set of seven distinct volumes or as a single workload that is split into seven work items during scheduling) and that step B requires a 5-meter buffer around each volume. In other words, in order to process a given volume or work item, the computation of step B requires that neighboring data within 5 meters of the boundary of a given volume must also be input into step B (because the buffer of the given volume will intersect with the neighboring volume). Thus, for example, the computation of volume 5 in step B will also require data from volume 7 from step A (because volumes 5 and 7 are within 5 meters, the buffer of volume 5 will intersect with volume 7), but the computation of volume 5 in step B will not require data from volume 6 from step A (because volumes 5 and 6 are greater than 5 meters apart, the buffer of volume 5 will not intersect volume 6). Also, the distance between volumes 2 and 3 is greater than 5 meters, but between volumes 3 and 6 is less than 5 meters.

Accordingly, workload items 1 to 7 can be computed in parallel in step A (i.e., A1 to A7), but, the workload items B1-B7 will have the following dependencies:

B1 depends on A1, A2
B2 depends on A1, A2
B3 depends on A3, A6
B4 depends on A4
B5 depends on A5, A7
B6 depends on A3, A6
B7 depends on A5, A7

Geospatial Scheduling System

Figure 10:
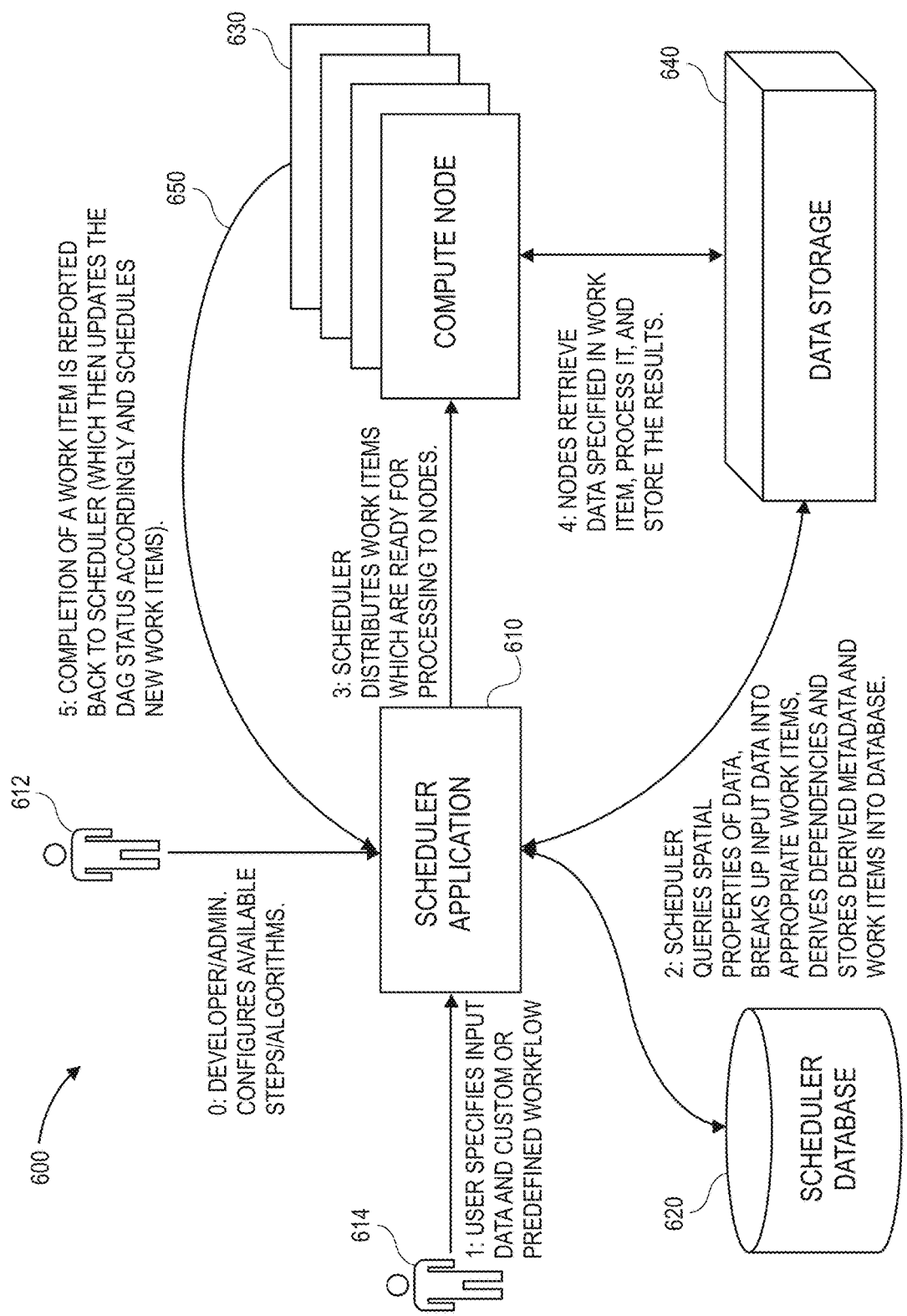
FIG. 10 illustrates one embodiment of a geo-spatial scheduling system that may be used to implement the present invention.

FIG. 10 illustrates one embodiment of a geo-spatial scheduling system 600 that may be used to implement the present invention. As shown, a scheduler application 610 is software that executes upon a computer and implements the steps as described below. Initially, a project developer or administrator 612 interacts with the scheduler 610 and defines the steps of a directed acyclic graph or graphs (DAG) as well as defining the DAG itself, as described below in 704 and 708. A user 614 will specify the input data to be processed (such as a batch of two-dimensional grid-based aerial images, three-dimensional grid-based mesh, two-dimensional free-form polygonal aerial images, three-dimensional non-grid-based point cloud data, etc.) and may also specify a custom or predefined workflow.

A user may specify a predefined workflow; the assumption is that the workflow is already stored in the scheduler's database and has a name or identifier and the user refers to this name or identifier, as in "Please execute workflow 123 on this workload." A user may also specify a custom workflow; the assumption is that available algorithms are already defined and users can refer to them using names or identifiers, as in "Custom workflow: step A uses algorithm 17, step B uses algorithm 4, step C uses algorithm 9. Dependents of step A are step B and step C; dependents of step B is step C," (for a DAG that would have lines from A to B, A to C and from B to C).

Also shown is a scheduler database 620 which may be implemented in a database such as PostgreSQL on the same computer as scheduler 610 or on a different computer. Database 620 includes the spatial properties of the data such as location, area, or shape, the dependencies between work items and metadata such as available algorithms and pre-defined workflows. The scheduler 610 uses information in the database to query spatial properties of the data, split the workload into workload items, calculate and store dependencies, etc., as explained below in 712-720. Once the work item dependencies have been calculated by the scheduler 610, the scheduler is then able to determine which work items are ready for processing and distribute those work items to any of compute nodes 630. As known in the art, a compute node may be any type of computing device such as a laptop, desktop or server computer, or may be any type of virtual machine executing upon a computer, such as virtual machines executing upon computers in a cloud-based computing platform. Accordingly, the compute nodes may be individual computers, may be virtual machines executing upon one or more computers, or may be a mixture of both.

Once assigned a particular work item, each compute node retrieves the data specified in the workflow from data storage 640, processes that work item, stores the result back in data storage, and then notifies the scheduler that the work item has been completed. As known in the art, data storage may be any suitable computer storage such as hard disks, tape storage, network file systems, or cloud-based blob storage.

Once a work item has been completed, the compute node notifies 650 the scheduler 610 that the work item has been completed and the scheduler may then update the status of the DAG and schedule new work items that depend upon the just recently completed work item. Advantageously, it is not necessary for the scheduler 610 to wait until all work items in a particular step have been completed before beginning processing of a next step. Any work item in a next step may be begun as long as those work items upon which the next step depends have been completed.

Geo-Spatial Dependency Aware Job Scheduling Flow Diagram

As mentioned above, the data input to the scheduling system for processing is anchored and is located in Euclidean space and may optionally be aligned on a two-dimensional or three-dimensional grid, and may even be data located in higher dimensions, as long as it is possible to calculate a measure of distance between data items for purposes of calculating an overlap or intersection between work items, or a buffer. Further, any data used during processing that is not referenced with respect to a geospatial location is simply treated as an opaque black box and is not subject to the special scheduling considerations discussed below. Instead, such data may be treated like a single, non-divisible entity and schedule accordingly to the DAG specification. An example is decompressing a ZIP compressed data set that contains population counts (and other attributes) for all nations worldwide, as the compression of ZIP files cannot be split into geospatial work items.

If additional data (typically from a previous workflow run) is available and should be used during scheduling, then the location and extent of this data is known to the scheduler.

Figure 11A:
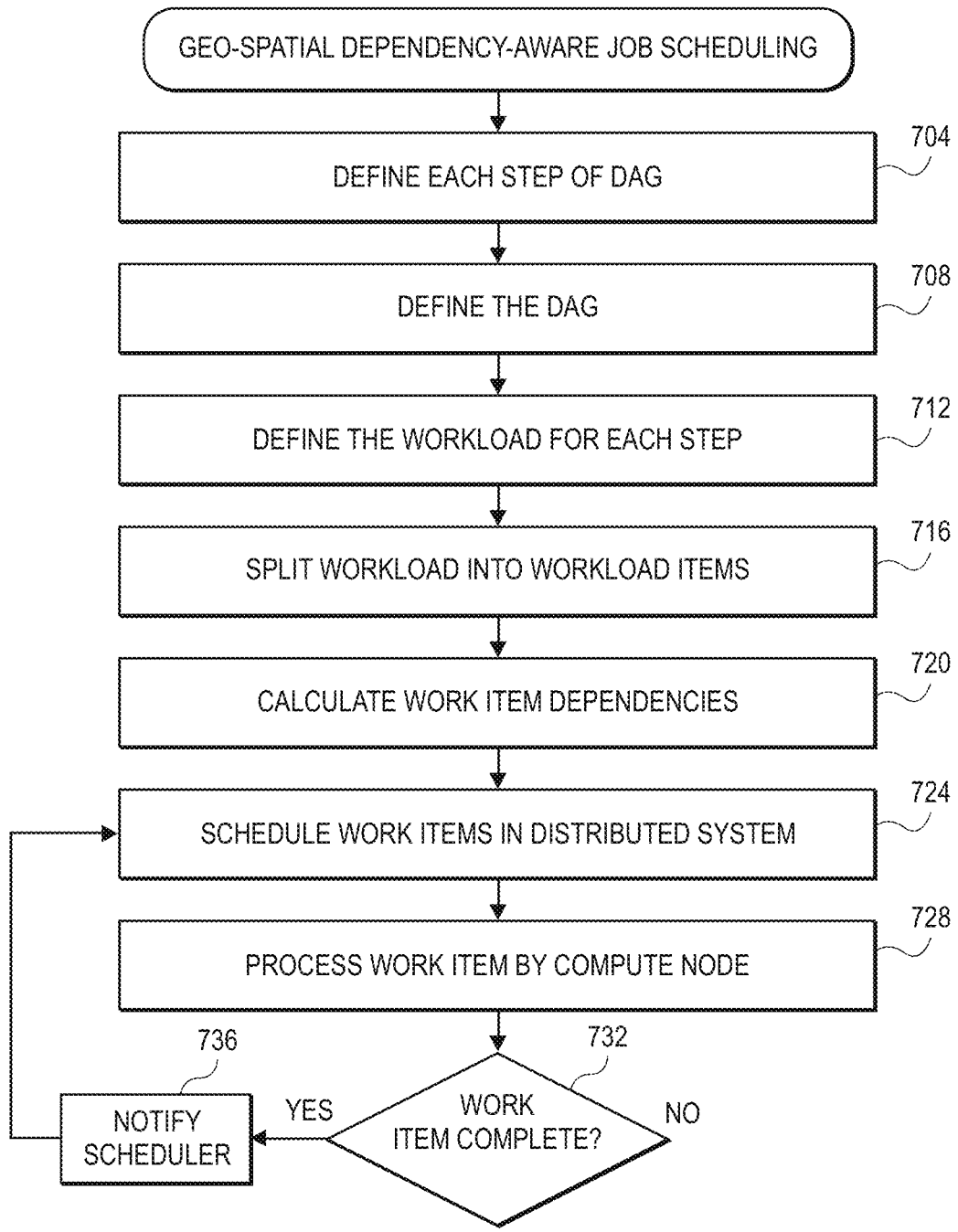
FIGS. 11A and 11B are a flow diagram describing one embodiment by which scheduling is performed.
Figure 11B:
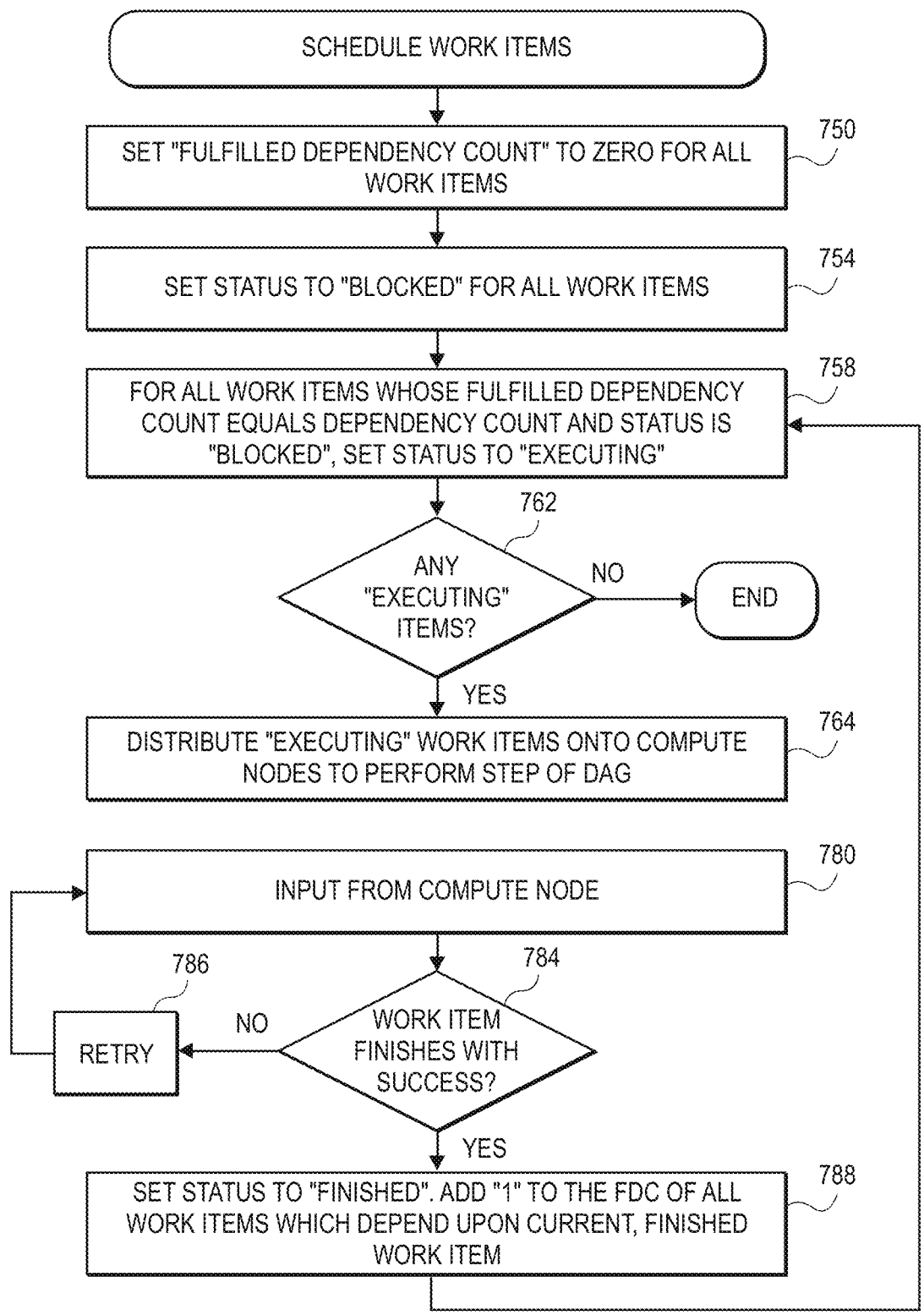

FIGS. 11A and 11B are a flow diagram describing one embodiment by which scheduling is performed. In a first step 704 a developer or administrator will define each step of a DAG. For each step, the program or algorithm which is to be executed upon the data is defined, as well as the type of input and type of output for each step. For example, the input may be image data and the output may be image data, as well as geometries for two-dimensional processing of images that is, using the above example of two-dimensional images of cities, a first inference step using a computer model may have an input type of image as well as an output type of image, whereas a second vectorization step may have an input type of image but an output type of geometries such as polygons or rectangles. For a three-dimensional point cloud, the input may be a three-dimensional point cloud and the output may be a defined three-dimensional volume or shape.

Also defined for each step is the minimum input size, the preferred input size and a maximum input size, for example, for two-dimensional images the sizes may be defined in terms of number of tiles, size in bytes, square kilometers, etc. Or, for example, if the input is rectangles indicating buildings (i.e., involving the processing of a city), the minimum input size may be three rectangles and the maximum may be 5,000 rectangles. For a three-dimensional point cloud the minimum, preferred and maximum may be defined in terms of the volume of the shape, number of data points, etc. Typically, these minimum, preferred and maximum sizes are defined per work item. As described in greater detail below, it will be the responsibility of the scheduler to split up the workload into work items of the appropriate size.

The developer also defines any required context or buffer for each step, for example, for two-dimensional images a buffer may be defined in terms of tiles, pixels, a distance in meters, etc. For a 3-D point cloud a buffer may be defined in terms of a metric or distance between the volumes.

For example, a six-step DAG used to analyze two-dimensional images may be defined as shown in Tables 1 and 2.

TABLE 1

| step | spatial | algorithm |
|---|---|---|
| A | y | detection |
| B | y | rooftypes |
| C | y | vectorization |
| D | y | enrichment |
| E | n | metrics |
| F | Y | conflation |

TABLE 2

| algorithm | input type | output type | context |
|---|---|---|---|
| detection | raster | raster | 0 m |
| rooftypes | raster | raster | 0 m |
| vectorization | raster | vector | 100 m |
| enrichment | raster | key-value attributes | 50 m |
| metrics | raster | statistics | null |
| conflation | vector/attributes | geopackage | 50 m |

In a next step 708 a developer or administrator will define the DAG itself. Thus, for each step, the dependencies between steps are declared. Together these dependencies form a directed acyclic graph or DAG (the DAG property may also be enforced by algorithmic validation).

Figure 12:
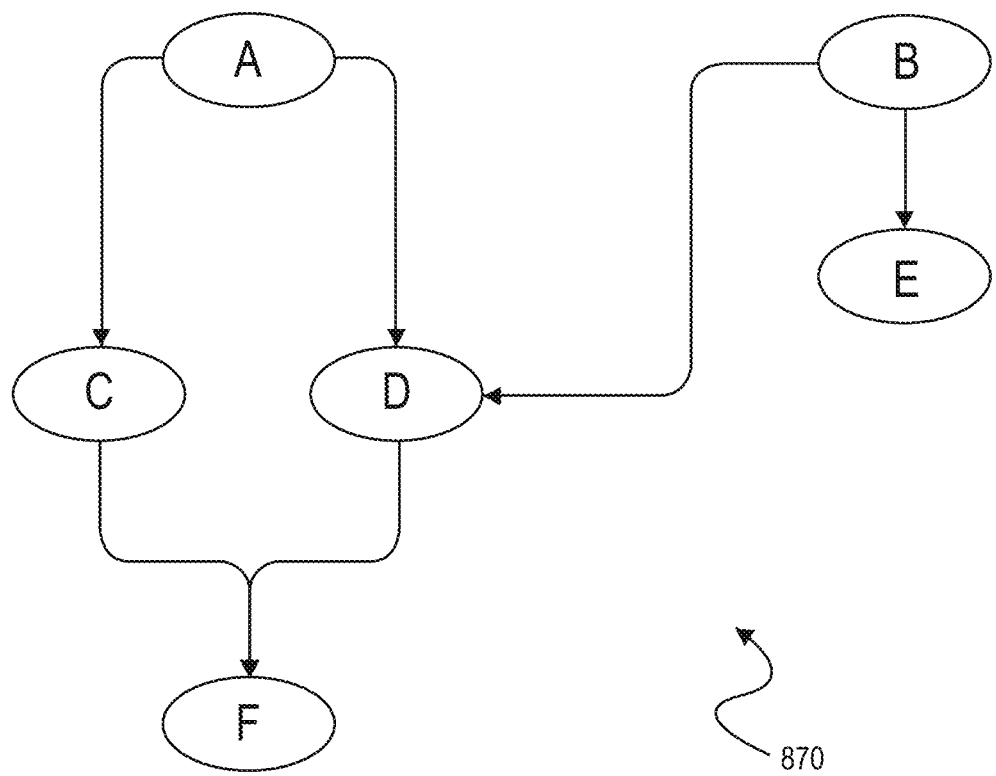
FIG. 12 illustrates an example DAG.

FIG. 12 illustrates an example DAG 870. Considering the DAG of FIG. 12, the following definition of Table 1 defines that DAG, which has two starting steps (A, B), two intermediate steps (C, D) and two final steps (E, F).

TABLE 3

| Step | Dependency |
|---|---|
| A | — |
| B | — |
| C | A |
| D | A, B |
| E | B |
| F | C, D |

In a next step 712, for each step the workload will be defined. The following assumptions are made:

The workload is spatially referenced, i.e., it exists within an n-dimensional Euclidean space and its boundaries can be defined using an n-dimensional bounding box or polygon. Examples include 2-D aerial images that are polygons or are grid based, e.g., FIGS. 7, 8 or FIGS. 5, 6A-C, and 3-D point clouds, e.g., FIGS. 9 and 2.

Input and output data of steps are spatially referenced, and apart from context (buffer) considerations, methods and operations within steps are local, meaning the output data is located in the same space as the input data, and the area of the output data is identical to the area of the input data (again not considering any buffer).

The workload definition begins at the starting steps (i.e., steps which have no dependencies) and works its way through the directed acyclic graph. For each step of the DAG perform actions (A) through (D):

(A) Calculate the spatial extent of the workload (either from input or from previous step). For example, FIG. 6A shows that the spatial extent of the workload are the tiles A8, A14, A15, A20 and A21.

Figure 13:
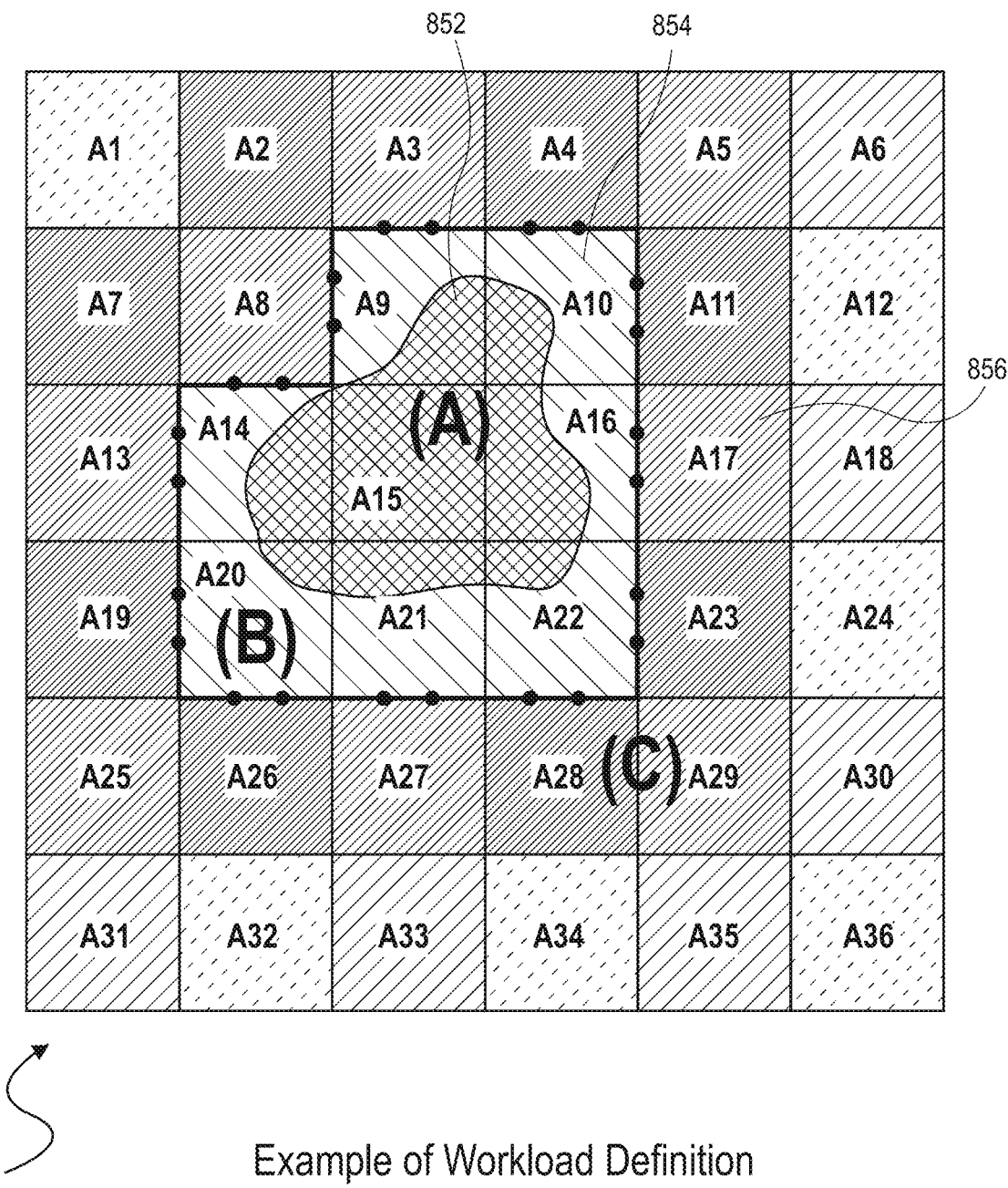
FIG. 13 illustrates an example of a workload definition for a workflow having a single step based upon an input area of image tiles.

(B) If the step is grid-based, then extend the workload area to the nearest grid line (if not already on a grid line). For example, FIG. 13 shows a blob region 852 which will be extended to include all of the tiles with which it overlaps, that is, the dotted region.

(C) If the step needs context or buffer data, i.e., data is processed from space in proximity to the workload, then: (i) calculate the extent of the surrounding context which also fully contains the input data using an algorithm that can be separately defined for each step; and (ii) If the step is grid-based, then extend the resulting space to the nearest grid line. Thus, a buffer is used to determine if the workload should be enlarged.

Next, (D) store the calculated extent as the workload of this step in the database.

The result of (D) of one step of the workflow is then used as input in (A) for dependent steps. Note that in grid-based steps, the size of the grid (i.e., the extent of the smallest grid unit) might be different from one step to the next. That is why the extent of the output data is not automatically aligned with the current step's grid, but is then individually aligned with the dependent steps' grids.

FIG. 13 illustrates an example of a workload definition for a workflow having a single step based upon an input area of image tiles 850. Given the blob 852 as the input workload to the single step, its spatial extent is calculated in action (A) as shown at 852. If the single step is grid based, then the area is extended 854 in action (B) to the nearest dotted grid line, thus encompassing tiles A9, A10, A14-A16, A20-A22. If a context of 1 tile is specified in the single step, then the input is extended to area 856 in action (C) and then stored as area of the workload in action (D). Area 856 includes tiles A2-A5, A7-A11, A13-A17, A19-A23 and A25-A29.

Figures 14A, 14B, 14C:
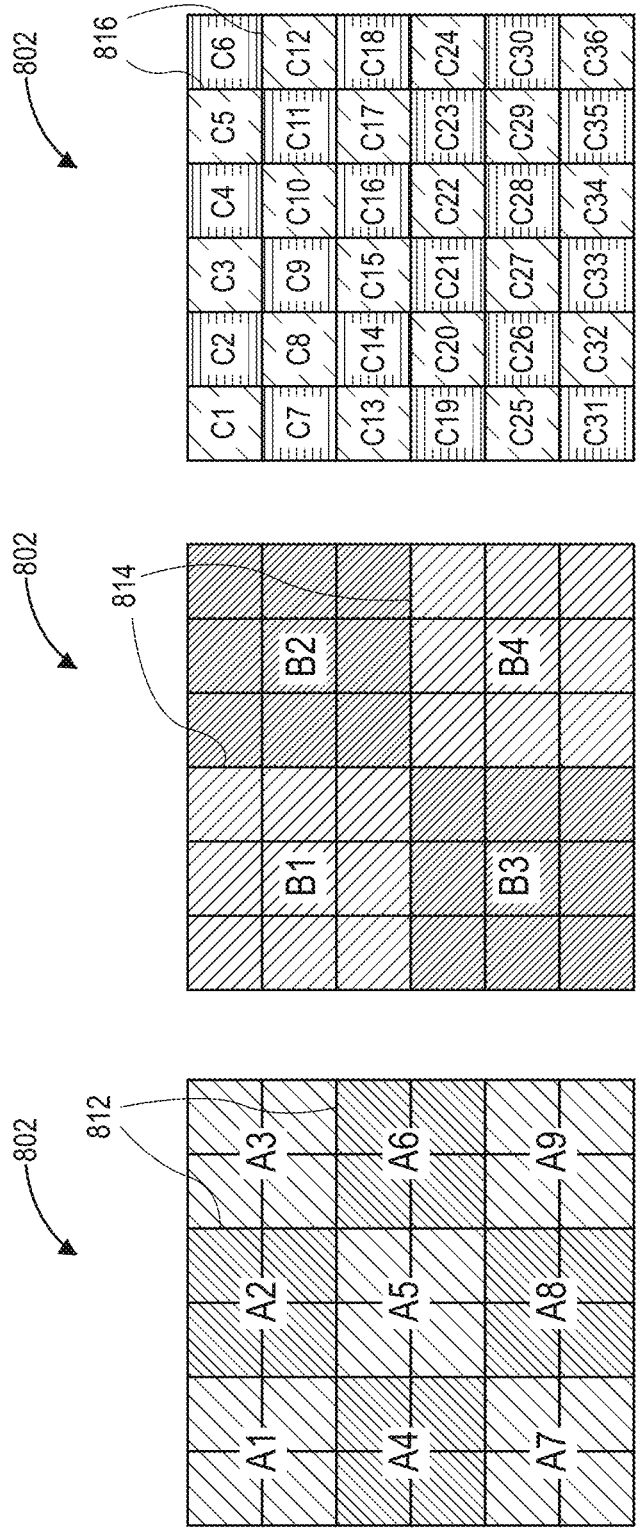
FIGS. 14A-14C illustrate a second example of a workload definition for steps of a workflow.

FIGS. 14A-14C illustrate a second example of a workload definition for steps of a workflow. FIG. 14A shows the grid 812 (200×200 pixels) for step A; FIG. 14B shows the grid 814 (300×300 pixels) for step B; and FIG. 14C shows the grid 816 (100×100 pixels) for step C. Tiles of 100×100 pixels are shown within each grid.

Assume that the 2-D grid-based area 802 as shown (such as a 2-D aerial image or images) or a portion of it is input into a DAG and that the DAG implements the workflow in three steps A→B→C. As shown, each step has a different input size: step A uses 2×2 tiles as input, step B uses 3×3 tiles as input, and step C uses a 1×1 tile as input. Further, step C's context is defined as 1 unit (100 pixels), that is, step C requires a 1-unit buffer around each tile. Assume that the initial workload input into step A is a 100×100 pixels area within A1.

A's workload is 200×200 pixels (A1)

B's workload is extended to 300×300 pixels (B1), thus overlapping with regions A2, A4 and A5 and hence sources data from A1, A2, A4, and A5 (if such data pre-exists and is registered with the scheduler). B1 does not depend upon work items A2, A4 and A5 because they are not being processed in step A, but B1 will use that pre-existing data if available.

C's workload is 400×400 pixels (adding 1 unit of buffer) with C1 being the upper left corner and C22 being the lower right corner of the 400×400 pixel area. Without the buffer, region C1-C3, C7-C9 and C13-C15 would be input, but adding the 1 unit of buffer means that the tiles surrounding that square are now also used as input (C1 being the upper left corner and C22 being the lower right corner of the 4×4 area) and hence step C is sourcing data from B1-B4 (assuming that data from B2, B3 and B4 is already pre-existing). Note that because each tile of step C has a 1-unit buffer, that is, each tile is influenced by input data within one unit's reach, C4 is influenced by B1 because B1's area is within one tile (in C's grid) of C4, C10 is influenced by B1, etc., thus necessitating their inclusion in step C. By contrast, drawing a one-unit buffer around tile C5 does not intersect with the area B1, hence, there is no need to perform a calculation of C5. So, although step C will depend upon data from B1, it will also use data from B2, B3 and B4, if pre-existing, but will not depend upon that data.

In 716 the workload may be split into any number of workload items. Thus, for all steps it is checked whether the workload is too large to be processed in one piece. If it is too large, it is split into several workload items. If there exists a suitable metric for a step that allows estimation of resource usage (CPU, memory, I/O, etc.) for a given slice of the workload, then this metric is used. Typically, a metric yields different values for different slices/spaces of the workload (e.g., rural vs. suburban vs. forest vs. sea areas). The metric itself might only have a sparse definition, e.g. maybe it is defined for cities larger than 100,000 inhabitants, but not anywhere else. In that case, for undefined spaces, a default value for the metric is assumed. If no metric is available, splitting is done under the assumption that resource usage is evenly distributed in the given input space.

In one example, consider the workload being a set of images covering all of the city of Los Angeles. If that region is too large, it will be split into work items, each work item being, for example, a single tile, assuming that the images are laid out in a grid. Or, each work item might encompass seven tiles, twenty-five tiles are more. And, when we speak of work items intersecting, we refer to any part of the work item intersecting with another work item. For ease of explanation, many parts of this disclosure assume that a work item is a single tile.

A workload may be too large because the compute node cannot the size of images. By way of example, the imagery of Los Angeles might be 10 TB which is typically larger than memory (RAM) on a single node. So, in order to process this data, it needs to be split up into chunks that fit into a node's memory. Once split up, the chunks (that is, work items) can either be processed on a single node one after the other or distributed onto 100 nodes which are able to finish the computation in 1/100 of the time. (Note that 100 nodes running 1/100 of the time will still incur the same cost/resource usage, so the advantage is enabling and speeding up computation.) And, while there may be algorithmic limitations as well as compute node limitations, the main driver is parallelization of computation and hence this possibility to scale the computation to many nodes.

Possible splitting algorithms are discussed in e.g. "Spatial Partitioning Techniques in SpatialHadoop" (Eldawy, Alarabi, Mokbel, 2015), as well in as in standard distributed systems literature. As a result, a reference to each workload item and its spatial extent (e.g. a bounding box, or list of tile identifiers, etc.) is stored in the scheduler's database. In particular, two algorithms for splitting work items may be used. For each step it can be configured which one of these algorithms is to be used.

The first is a top-down algorithm. For each step, perform actions A, B and C. (A) If metric for workload item is larger than preferred value, split item into defined fractions: 1. Either: just split workload in halves along a single dimension (using alternating dimensions in each round) 2. Or: split workload into different fractions along a single dimension (for example, calculate metrics for 50:50, 60:40, 70:30, 80:20, and 90:10 splits along space), and choose those fractions that most closely match a 50:50 split according to the given metric. 3. Or: split along multiple dimensions in a single step, for example producing four items out of a single item in 2D workloads, or 8 items in 3D workloads etc. Again trying different fractions analogous to (ii) and choosing the most suitable split according to the given metric.

(B) If fractional work items from (A) are farther away from preferred input size than work item before split, and work item before split was smaller than maximum input size: undo split and finish. (C) Else: for each fractional item produced in (A) recursively do processing according to (A), until all work items are finished.

The second is bottom-up algorithm. For each step perform actions, A, B and C. (A) If workload is larger than defined preferred input size, calculate initial item count as count=workload size divided by minimum input size. (B) Calculate the nth-root of count (n=number of input dimensions) and for each dimension round (up or down) to natural numbers such that the product is smaller or equal to the count from (A). These numbers form a grid of items along which the workload is initially sliced. (C) Loop across all items in the defined grid from (B): 1. If the item is larger than the preferred size (according to the specified metric): finish this item (i.e. add to final list of workload items). 2. Else: combine next neighbouring item (in loop order) with current item, go to (1).

Next, 720 calculates dependencies between workload items. Based upon the previous steps, various assumptions can be made before the scheduler 610 performs step 720. For one, the input data for this instance (i.e., this run) of the workflow has been specified by the user or by another computer program. Also, the workload for each step of the workflow in the DAG has been defined in step 712 above. And, based upon these workload definitions, the workload of each step has been split into (smaller) workload items as described in step 716 above, and the spatial extent of each item is stored in the scheduler database 620.

A workload for each step need not always be split into items. There are steps that can perform their computation on the entire workload as single item. Nevertheless, we can assume that the split algorithm (described above) always executes because given the right parameters (i.e., preferred and maximum input size larger than actual workload size) it is possible that no split will happen.

One way to keep track of the dependencies between workload items is simply to store the lists of dependencies such as have been defined above, e.g., "B6 depends on A8, A14, A15," taken from the example of FIG. 6C. Such a dependency is defined and stored for each work item of each step using, for example, the algorithm given directly below, or using a similar technique. The scheduler then stores these lists and then determines when workload item B6 may be scheduled for execution once items A8, A14 and A15 have finished executing by reference to these lists. It is realized, though, that a great deal of storage may be necessary, especially when workload items number in the thousands, millions, or more.

In another technique, instead of storing these lists, the scheduler only stores the number of work items upon which a current work item is dependent. Using the above example, the scheduler would only store in its database that B6 has a dependency count of "3". Preferably, a dependency count is stored for each workload item of each step and may be stored in a single table of the scheduler database. Hence, given the above, the following procedure is used for each workload item:

Determine upon which steps of the DAG that the current step (to which the workload item belongs) is dependent.

If the current step is not dependent on other steps (e.g., an initial step): store 0 (zero) as the dependency count for the workload item and proceed with the next workload item.

Otherwise: calculate the dependency area for the workload item:
If the current step defines a context (buffer), calculate the buffered area of the workload item. (Calculation for the item is done in the same way as described in step 712. The buffered area is then the dependency area for this item.
Else (no context for the step): the workload item area is the dependency area for this item.

Determine the number of intersecting workload items for the current workload item area from the step or steps upon which the current step depends and store this number as the dependency count in the database. (A step in the DAG might depend upon multiple steps.) Intersection is always determined based upon workload item area of a previous step's output with the dependency area of the current step's work item. The resulting number from this intersection is the dependency count for the current workload item.

In a first example, consider FIG. 6C in which there are two steps A and B and that step B requires no buffer. Considering workload item B1 of step B, we note that its area only intersects with the area of workload item A8, meaning that item B1 cannot execute until A8 finishes its processing first. Because item B1 is only dependent upon one other work item, its dependency count is "1".

Table 4 below is an example of how the scheduler may keep track of dependency counts, status, run identifier, etc., in the context of a particular workflow for a simple DAG having two steps, where step A is the initial step and has three items, step B is the final step and has four items, and B depends upon A. Typically, such a single table is used for the entire workflow of a DAG although it is possible to use multiple tables or different data structures storing similar information. Such a table is the result of step 720 and will be used during scheduling in the next step.

TABLE 4

| workflow_id | run_id | step | item_nr | area | dependency count | fulfilled dependency count | status |
|---|---|---|---|---|---|---|---|
| 3 | 12 | A | 1 | ... | 0 | 0 | executing |
| 3 | 12 | A | 2 | ... | 0 | 0 | finished |
| 3 | 12 | A | 3 | ... | 0 | 0 | executing |
| 3 | 12 | B | 1 | ... | 1 | 1 | executing |
| 3 | 12 | B | 2 | ... | 3 | 1 | blocked |
| 3 | 12 | B | 3 | ... | 1 | 1 | finished |
| 3 | 12 | B | 4 | ... | 2 | 2 | ready |

Next, in step 724 the work items are scheduled for processing within the distributed system as will be described in greater detail below with respect to FIG. 11B. In step 728 a work item is processed by a compute node. If the work item is complete in step 732 then the scheduler is notified in step 736 and control returns to step 724. If the item is not complete, then processing continues.

FIG. 11B is a flow diagram describing steps 724-736. Given the database with all work items, their associated steps, their bounding box, and the dependency count (DC), the following is performed by the scheduler as shown in steps 750-780.

In steps 750 and 754, set the fulfilled dependency count for all work items to zero and set the status of all items to "blocked."

In step 758, for all work items where fulfilled dependency count equals dependency count and whose status is "blocked," set the status to "executing." Thus, once the fulfilled dependency count equals the dependency count for a particular work item, this means that all of the work items upon which the current work item has depended have finished successfully and that therefore the current work item may be scheduled for execution. Once a work item is marked "executing" it will be distributed to a compute node and will be processed by that compute node as soon as possible, i.e., it is possible there will be a slight delay while the work item is scheduled and input data is acquired by that compute node, but in general the work item will be processed more or less immediately. On the other hand, for large workloads and fewer compute nodes, e.g., thousands of work items and only dozens of compute nodes, it is possible that it may be hours or more before a particular work item marked as "executing" is actually processed by a compute node. But, the user is agnostic about when precisely a work item is processed after it has been marked as "executing;" such a work item may be processed immediately or may need to wait, all depending upon the algorithm used by the scheduler. Thus, in general, a status of "executing" means has been scheduled for execution or is actually executing. Note that a scheduler may introduce an additional "ready" state to distinguish actual execution from simply being scheduled for execution, and hence make the difference visible to the user.

In step 762, if there are no "executing" steps after step 758 then stop. Because a work item only has states of executing, blocked, finished or failed, if there are no executing work items this means that everything else is either blocked, finished or failed and the workflow then ends.

In step 764, distribute "executing" work items onto virtual machines/compute nodes in order to perform the calculation specified in the step of the DAG. Distributing a work item to a particular compute node may be performed in different manners depending upon availability of compute nodes (idle, busy, etc.), the resources of each compute node, or the technique described below. Or, each executing work item is placed into a first-in first-out queue and an available compute node simply picks the next item in the queue for processing. Or, the scheduler chooses a compute node based upon the information it has about each node.

In step 780 the scheduler receives status 650 of a work item from a compute node, and when a work item has finished successfully in step 784, set its status to "finished" in step 788 and add "1" to the fulfilled dependency count (FDC) of all work items which depend upon the work item which has just finished successfully. Thus, if a tile B8 only depends upon a single tile A8, and tile A8 is processed successfully, then the FDC of tile B8 is increased by one, and tile B8 will have its status set to "executing" in step 758 because it only had a dependency count of "1" to begin with. In one particular embodiment, the list of dependencies for each tile is not stored within the system because of the resources that would be required. Accordingly, in step 788 the scheduler determines which work items are dependent upon the work item which has just finished successfully. Thus, the scheduler determines which work items intersect with the work item which has just finished successfully. In this embodiment, performing this analysis of which work items are dependent upon the finished work item is less resource intensive than storing all dependencies of the DAG in the workflow. It is realized that as a work item may take a few minutes to process, or may take up to several hours to finish, it is inexpensive to perform this calculation. In such a case, even with approximately 500 nodes, the calculation need be performed at most once per second. In another embodiment, though, it is possible to store all of the dependencies for the DAG (as discussed in the examples above) and then use a list of from which work items a particular work item depends in order to determine if all of the work items from which a particular work item depends have finished processing successfully. If so, then the particular work item may be scheduled for execution.

If a processing step for a work item fails in step 784 (due to some error during processing of the work item), the execution is retried in step 786 a specified number of times. If all retries fail, then the work item's status is set to "failed" and control returns to step 780 to await the next input from a compute node. The scheduling automatically reaches a point where either all work items are successfully finished, or there are some failed steps with dependent steps remaining in the "blocked" state. Hence, scheduling stops automatically, with the check in step 762.

Advantageously, by allowing work items to depend on one another, a work item in a later step of the DAG may be scheduled for execution as long as its dependencies have been satisfied, even if the prior step of the DAG has not been completed. For example, processing of a work item B1 from step B of the DAG may begin (as long as the work items from which it depends have finished successfully) even if many of the work items from step A of the DAG have not finished yet.

Optimization of Distribution of Workload Items to Compute Nodes

In step 764 directly above, the distribution of steps of the DAG and corresponding workload items onto virtual machines/compute nodes attempts to minimize the network and I/O load by distributing workload items according to the following criteria:

- If possible, schedule a dependent workload item on the same machine where the previous step and required work item finished processing, in order to reuse cached results from that previous step and required work item. For example, B1 of FIG. 6C is dependent upon A8, and the scheduler will schedule item B1 upon the same compute node were item A8 has just finished successfully. If, for example, B2 is also dependent upon A8, B2 will be scheduled on another node; i.e., we do not wait for B1 to finish so that B2 can run on the same node; computation should be done in parallel for efficiency.
- If possible, schedule spatially-adjacent workload items of the same workflow step on the same machine, in order to reuse cached input results—especially if the current workflow step uses some form of context and hence it is likely that data can be reused. For example, items B2 and B3 of FIG. 6C will be scheduled upon the same compute node as if there is any buffer around the work items it is likely that both items B2 and B3 will have some input data from step A in common.
- If steps of the DAG share resources (e.g. storage account, databases, etc.) then schedule workload items of those steps first where there is the least contention for shared resources. For example, if a step A of the DAG accesses the storage account, a step B of the DAG accesses the database and the storage account, and a step C of the DAG accesses just the database, and the database is close to its resource limit, preferably schedule workload items from step A (which do not access the database) first. If, on the other hand, the storage account is close to its limit, preferably schedule workload items from step C.
- Utilize all nodes assigned to this workflow. As soon as a compute node is idle, schedule a new workload item on that idle compute node according to the criteria above.

Extension to N-Dimensional Space

Above are provided examples of workloads that exist in two-dimensional or three-dimensional space, but the invention is applicable to any n-dimensional Euclidean space. As is known, a distance between two points (or areas or volumes) in two-dimensional or three-dimensional space is the length of a line segment between these two points, areas or volumes, and may be calculated using the Cartesian coordinates of the points using the Pythagorean theorem. In two dimensions, the distance may be calculated between the closest edges of two areas, between the center of such areas, etc.; in three dimensions a distance may be calculated between the closest edges of the volumes, between their centers etc., and one of skill in the art will be able to make that design choice.

In four dimensional spaces and higher, a distance may still be calculated between two points as long as general Euclidean properties hold such as a distance metric exists, the distance is commutative, associative, distributive, etc., and a determination may be made as to whether areas, volumes or n-dimensional objects intersect. The following formulas may be used, assuming that points are named "q" and "p" and that "sqrt" means the square root, and that dimensions are named X, Y, Z, and 1 . . . N respectively.

1-D (X): |qx−px|
2-D (X, Y): sqrt[(qx−px)^2+(qy−py)^2]
3-D (X, Y, Z): sqrt[(qx−px)^2+(qy−py)^2+(qz−pz)^2]
n-D (1, 2, 3, . . . N): sqrt[(q1−p1)^2+(q2−p2)^2+(q3−p3)^2+ . . . +(qn−pn)^2]

Thus, in any n-dimensional space in which a workload exists, the above distance metric may be used to determine if n-dimensional objects intersect, or are adjacent, and if the n-dimensional objects in a particular step of the workflow have a buffer, it may be determined if these buffers intersect with other n-dimensional objects in that workload.

Computer System Embodiment

Figure 15:
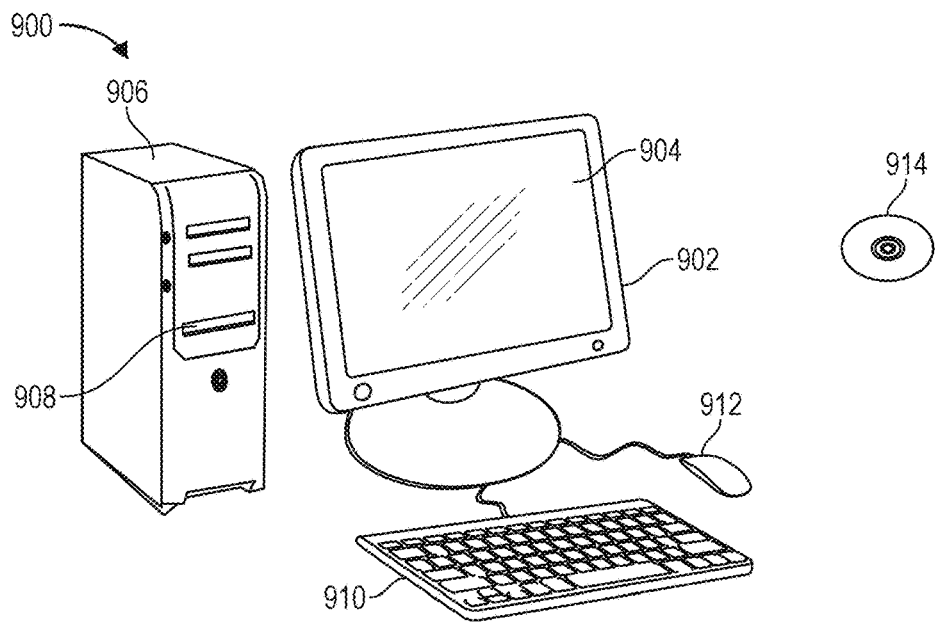
FIGS. 15 and 16 illustrate a computer system suitable for implementing embodiments of the present invention.
Figure 16:
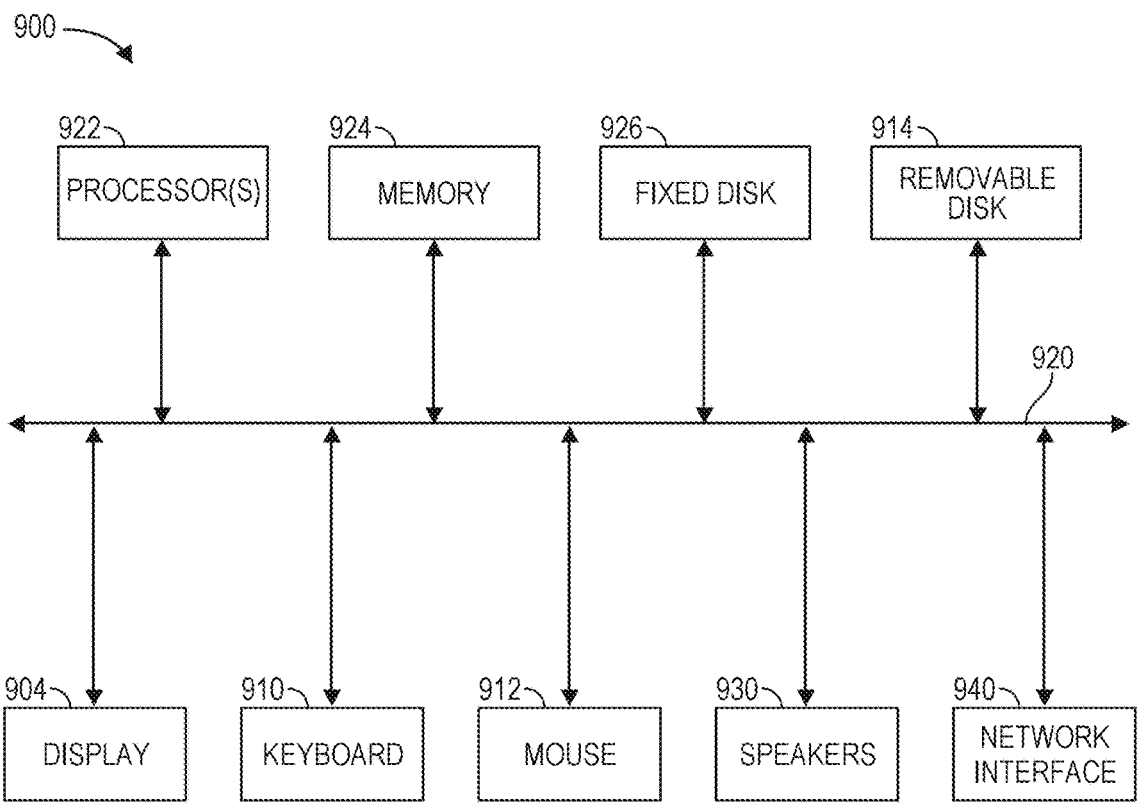

FIGS. 15 and 16 illustrate a computer system 900 suitable for implementing embodiments of the present invention. FIG. 15 shows one possible physical form of the computer system. Of course, the computer system may have many physical forms including an integrated circuit, a printed circuit board, a small handheld device (such as a mobile telephone or PDA), a personal computer, a super computer, or a network of computers. Computer system 900 includes a monitor 902, a display 904, a housing 906, a disk drive 908, a keyboard 910 and a mouse 912. Disk 914 is a computer-readable medium used to transfer data to and from computer system 900.

FIG. 16 is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, network file storage, cloud blob storage etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of scheduling a two-dimensional (2-D) workload for processing in a distributed computing system, said method comprising:
    splitting said 2-D workload into a plurality of 2-D first workload items according to a first step of a directed acyclic graph (DAG);
    splitting said 2-D workload into a plurality of 2-D second workload items according to a second step of a directed acyclic graph (DAG), said second step of said DAG been dependent upon said first step of said DAG;
    processing said plurality of said first workload items using a first algorithm of said first step of said DAG;
    determining that one of said second workload items is only dependent upon the output of a subset of said first workload items that have finished processing; and
    processing said one of said second workload items before all of said first workload items of said first step have finished processing using a second algorithm of said second step of said DAG.

2. A method as recited in claim 1 further comprising:
    determining that said subset of said first workload items has finished processing and in response to said determining identifying said one of said second workload items that is dependent upon said subset of said first workload items.

3. A method as recited in claim 1 further comprising:
    determining that said one of said second workload items is dependent upon one of said first workload items because said one of said second workload items' area intersects with said one of said first workload items' area.

4. A method as recited in claim 1 wherein said first workload items and said second workload items have the same 2-D size, and wherein said one of said second workload items is dependent upon one of said first workload items when said one of said second workload items' area intersects said one of said first workload items' area.

5. A method as recited in claim 1 wherein said first workload items and said second workload items have different 2-D sizes, and wherein said one of said second workload items is dependent upon a plurality of said first workload items because said one of said second workload items' area intersects said plurality of said first workload items' areas.

6. A method as recited in claim 1 wherein said first workload items and said second workload items have different 2-D sizes, and wherein said processing of said one of said second workload items includes pre-existing data located within a boundary of said one of said second workload items, said pre-existing data being output from a previous execution of said first step of said DAG.

7. A method as recited in claim 1 wherein said second algorithm of said second step of said DAG requires a buffer around each of said second workload items, said method further comprising:
    determining that said one of said second workload items is dependent upon any of said first workload items that are intersected by a region including said second workload item and said buffer.

8. A method as recited in claim 1 wherein said second algorithm of said second step of said DAG requires a buffer around each of said second workload items, said method further comprising:
    determining that a new workload item that is not one of said second workload items is within said buffer,
    determining that said new workload item is dependent upon at least one of said first workload items; and
    processing said new workload item using said second algorithm of said second step of said DAG when all of said at least one of said first workload items have finished processing.

9. A method as recited in claim 1 wherein said first workload items are arranged in a first rectangular grid and said second workload items are arranged in a second rectangular grid, or wherein said first and second workload items are polygons.

10. A method as recited in claim 1 wherein said splitting of said 2-D workload into a plurality of 2-D second workload items results in only a single 2-D second workload item.

11. A method of scheduling a three-dimensional (3-D) workload for processing in a distributed computing system, said method comprising:
    splitting said 3-D workload into a plurality of 3-D first workload items according to a first step of a directed acyclic graph (DAG);

splitting said 3-D workload into a plurality of 3-D second workload items according to a second step of a directed acyclic graph (DAG), said second step of said DAG been dependent upon said first step of said DAG;

processing said plurality of said first workload items using a first algorithm of said first step of said DAG;

determining that one of said second workload items is only dependent upon the output of a subset of said first workload items that have finished processing; and processing one of said second workload items before all of said first workload items of said first step have finished processing using a second algorithm of said second step of said DAG.

12. A method as recited in claim 11 further comprising:
determining that said subset of said first workload items has finished processing and in response to said determining identifying said one of said second workload items that is dependent upon said subset of said first workload items.

13. A method as recited in claim 11 further comprising:
determining that said one of said second workload items is dependent upon one of said first workload items because said one of said second workload items' volume intersects with said one of said first workload items' volume.

14. A method as recited in claim 11 wherein said first workload items and said second workload items have the same 3-D size, and wherein said one of said second workload items is dependent upon one of said first workload items when said one of said second workload items' volume intersects said one of said first workload items' volume.

15. A method as recited in claim 11 wherein said first workload items and said second workload items have different 3-D sizes, and wherein said one of said second workload items is dependent upon a plurality of said first workload items because said one of said second workload items' volume intersects said plurality of said first workload items' volume.

16. A method as recited in claim 11 wherein said first workload items and said second workload items have different 3-D sizes, and wherein said processing of said one of said second workload items includes pre-existing data located within a boundary of said one of said second workload items, said pre-existing data being output from a previous execution of said first step of said DAG.

17. A method as recited in claim 11 wherein said second algorithm of said second step of said DAG requires a buffer around each of said second workload items, said method further comprising:
determining that said one of said second workload items is dependent upon any of said first workload items that are intersected by a region including said second workload item and said buffer.

18. A method as recited in claim 11 wherein said second algorithm of said second step of said DAG requires a buffer around each of said second workload items, said method further comprising:
determining that a new workload item that is not one of said second workload items is within said buffer,
determining that said new workload item is dependent upon at least one of said first workload items; and
processing said new workload item using said second algorithm of said second step of said DAG when all of said at least one of said first workload items have finished processing.

19. A method as recited in claim 11 wherein said first workload items are arranged in a first grid and said second workload items are arranged in a second grid, or wherein said first and second workload items are polygons.

20. A method as recited in claim 11 wherein said splitting of said 3-D workload into a plurality of 3-D second workload items results in only a single 3-D second workload item.

21. A method of scheduling an N-dimensional (N-D) workload for processing in a distributed computing system, N being an integer greater than or equal to four, said method comprising:
splitting said N-D workload into a plurality of N-D first workload items according to a first step of a directed acyclic graph (DAG);
splitting said N-D workload into a plurality of N-D second workload items according to a second step of a directed acyclic graph (DAG), said second step of said DAG been dependent upon said first step of said DAG;
processing said plurality of said first workload items using a first algorithm of said first step of said DAG;
determining that one of said second workload items is only dependent upon the output of a subset of said first workload items that have finished processing; and
processing one of said second workload items before all of said first workload items of said first step have finished processing using a second algorithm of said second step of said DAG.

22. A method as recited in claim 21 further comprising:
determining that subset of said first workload items has finished processing and in response to said determining identifying said one of said second workload items that is dependent upon said subset of said first workload items.

23. A method as recited in claim 21 further comprising:
determining that said one of said second workload items is dependent upon one of said first workload items because said one of said second workload items' region intersects with said one of said first workload items' region.

24. A method as recited in claim 21 wherein said first workload items and said second workload items have the same N-D size, and wherein said one of said second workload items is dependent upon one of said first workload items when said one of said second workload items' region intersects said one of said first workload items' region.

25. A method as recited in claim 21 wherein said first workload items and said second workload items have different N-D sizes, and wherein said one of said second workload items is dependent upon a plurality of said first workload items because said one of said second workload items' region intersects said plurality of said first workload items' region.

26. A method as recited in claim 21 wherein said first workload items and said second workload items have different N-D sizes, and wherein said processing of said one of said second workload items includes pre-existing data located within a boundary of said one of said second workload items, said pre-existing data being output from a previous execution of said first step of said DAG.

27. A method as recited in claim 21 wherein said second algorithm of said second step of said DAG requires a buffer around each of said second workload items, said method further comprising:
determining that said one of said second workload items is dependent upon any of said first workload items that are intersected by a region including said second workload item and said buffer.

28. A method as recited in claim 21 wherein said second algorithm of said second step of said DAG requires a buffer around each of said second workload items, said method further comprising:
- determining that a new workload item that is not one of said second workload items is within said buffer,
- determining that said new workload item is dependent upon at least one of said first workload items; and
- processing said new workload item using said second algorithm of said second step of said DAG when all of said at least one of said first workload items have finished processing.

29. A spatial scheduling system that schedules an N-dimensional (N-D) workload for processing in a distributed computing system, N being an integer greater than or equal to one, said system comprising:
- a directed acyclic graph (DAG) implementing a workflow to process said N-D workload, said DAG including at least first and second steps, wherein said second step of said DAG being dependent upon said first step of said DAG;
- a scheduler application arranged to split said N-D workload into a plurality of N-D first workload items according to said first step of said DAG, to split said N-D workload into a plurality of N-D second workload items according to said second step of said DAG, and to distribute said first workload items to a plurality of compute nodes, each of said compute nodes including a processor;
- at least one compute node of said plurality of compute nodes arranged to process said distributed first workload items using a first algorithm of said first step of said DAG, wherein said scheduler application being further arranged to determine that one of said second workload items is only dependent upon the output of a subset of said first workload items that have finished processing, and to distribute said one of said second workload items to a second compute node of said plurality of compute nodes; and
- said second compute node that processes said one of said second workload items before all of said first workload items of said first step have finished processing using a second algorithm of said second step of said DAG.

30. A system as recited in claim 29 wherein scheduler application being further arranged to determine that said subset of said first workload items has finished processing and to identify said one of said second workload items that is dependent upon said subset of said first workload items.

* * * * *